(12) United States Patent
Sato

(10) Patent No.: US 9,568,884 B2
(45) Date of Patent: Feb. 14, 2017

(54) IMAGE FORMING APPARATUS PROVIDED WITH BELT UNIT PIVOTALLY MOVABLY SUPPORTED AT MAIN CASING

(71) Applicant: Brother Kogyo Kabushiki Kaisha, Nagoya-shi, Aichi-ken (JP)

(72) Inventor: Shougo Sato, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/066,484

(22) Filed: Mar. 10, 2016

(65) Prior Publication Data
US 2016/0291539 A1 Oct. 6, 2016

(30) Foreign Application Priority Data
Mar. 31, 2015 (JP) .................. 2015-073381

(51) Int. Cl.
G03G 15/00 (2006.01)
G03G 21/18 (2006.01)
F16H 7/08 (2006.01)

(52) U.S. Cl.
CPC ........ G03G 21/1846 (2013.01); F16H 7/0827 (2013.01)

(58) Field of Classification Search
CPC .......... F16H 2007/0893; F16H 7/1281; G03G 2221/1684; G03G 2221/1654; G03G 15/0194; G03G 2215/0141
See application file for complete search history.

(56) References Cited

U.S. PATENT DOCUMENTS

| | | | |
|---|---|---|---|
| 2009/0245901 A1* | 10/2009 | Souda | G03G 15/206 399/330 |
| 2012/0155916 A1* | 6/2012 | Ito | B41J 29/02 399/110 |
| 2013/0121722 A1* | 5/2013 | Nakano | G03G 21/1628 399/110 |

FOREIGN PATENT DOCUMENTS

JP 2007-264041 A 10/2007

* cited by examiner

*Primary Examiner* — Walter L Lindsay, Jr.
*Assistant Examiner* — Jessica L Eley
(74) *Attorney, Agent, or Firm* — Banner & Witcoff, Ltd.

(57) ABSTRACT

An image forming apparatus includes: a main casing; a cartridge; a belt unit; and a fixing unit. The cartridge includes a photosensitive drum. The main casing includes a first side plate and a second side plate, interposing the fixing unit therebetween. The belt unit includes: an endless belt; a first pivot shaft supported at the first side plate; a first arm; a second pivot shaft supported at the second side plate; and a second arm. The belt unit is movable between an internal position where the belt contacts the photosensitive drum and an external position where the belt separates from the photosensitive drum. The first arm is positioned outward of the first side plate and connects the first pivot shaft to the belt unit. The second arm is positioned outward of the second side plate and connects the second pivot shaft to the belt unit.

20 Claims, 10 Drawing Sheets

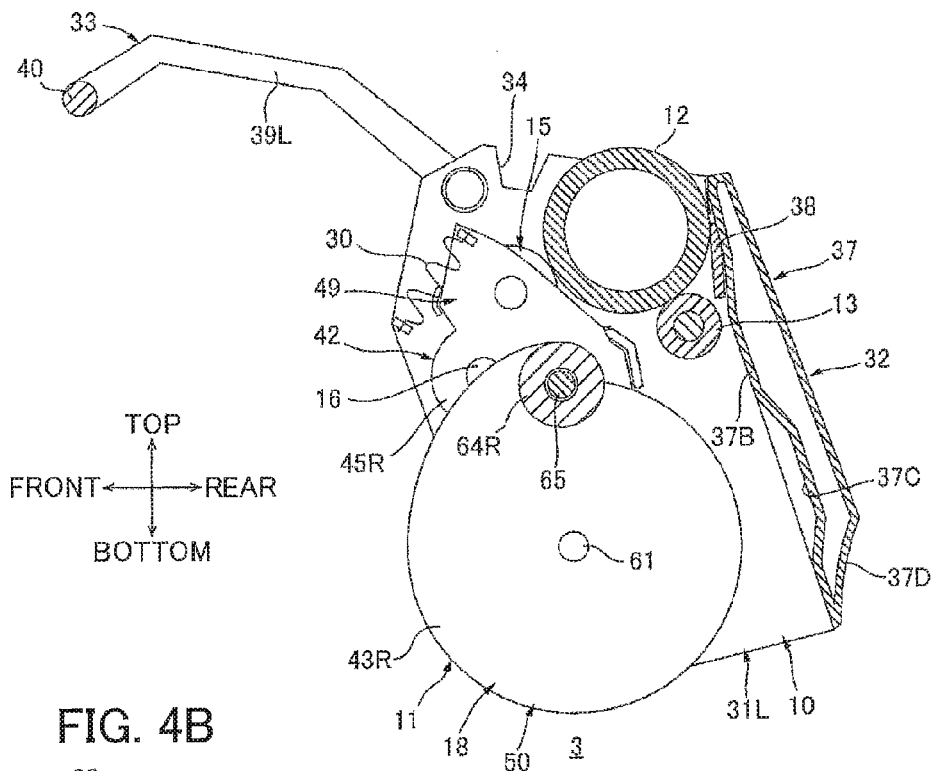
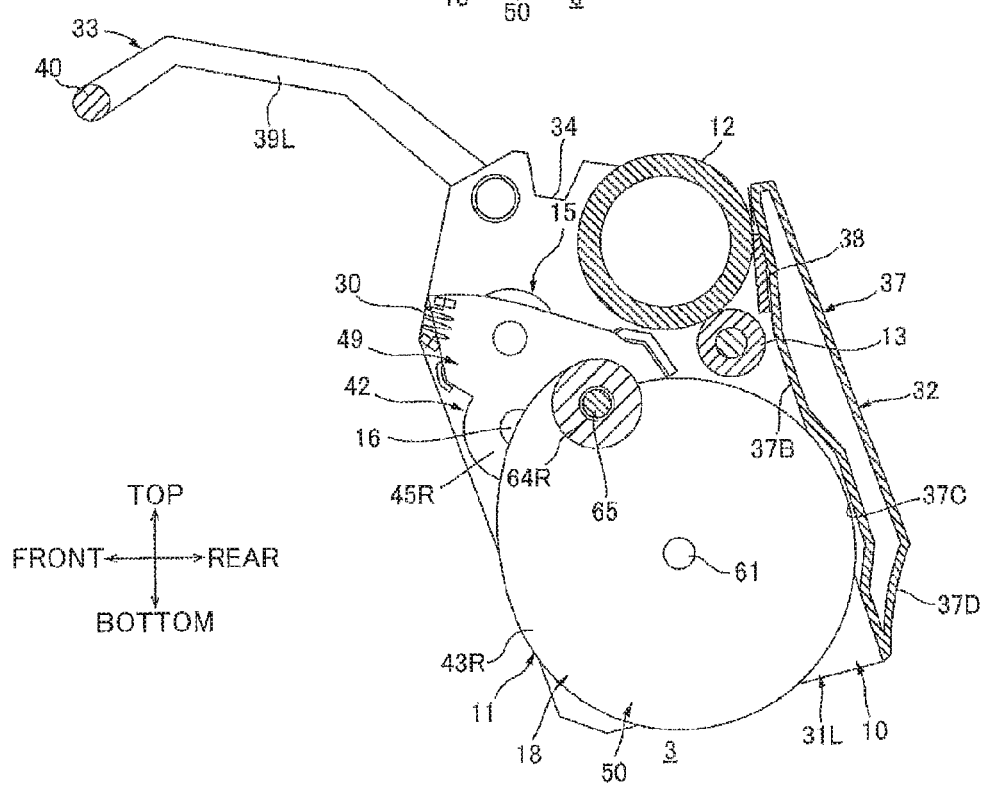

IMAGE FORMING APPARATUS PROVIDED WITH BELT UNIT PIVOTALLY MOVABLY SUPPORTED AT MAIN CASING

CROSS REFERENCE TO RELATED APPLICATION

This application claims priority from Japanese Patent Application No. 2015-073381 filed Mar. 31, 2015. The entire content of the priority application is incorporated herein by reference.

TECHNICAL FIELD

The present disclosure relates to an electrophotographic type image forming apparatus.

BACKGROUND

There is conventionally known an intermediate transfer type image forming apparatus as an electrophotographic type image forming apparatus. The intermediate transfer type image forming apparatus includes a process cartridge provided with a photosensitive drum, and a transfer belt in contact with the photosensitive drum. A toner image formed on the photosensitive drum is transferred onto the transfer belt, and then the toner image is transferred onto a sheet from the transfer belt.

One such image forming apparatus includes a process cartridge provided with a photosensitive drum and a developing unit, an intermediate transfer belt positioned above the process cartridge, a secondary transfer roller in contact with the intermediate transfer belt, and a fixing unit positioned upward of the secondary transfer roller.

In this image forming apparatus, the intermediate transfer belt is pivotally movable together with a top cover of a main casing of the image forming apparatus.

SUMMARY

In view of the foregoing, it is an object of the disclosure to provide an improved image forming apparatus.

In order to attain the above and other objects, according to one aspect, the disclosure provides an image forming apparatus including: a main casing; a cartridge; a belt unit; and a fixing unit. The main casing has an opening. The cartridge is configured to be mounted in and removed from the main casing through the opening. The cartridge includes a photosensitive drum. The photosensitive drum has an axis extending in an axial direction. The belt unit is movable between an internal position and an external position in a state where the cartridge has been mounted in the main casing. The belt unit moves outward of the main casing through the opening when moved from the internal position to the external position. The fixing unit includes a heating member and a pressure member in contact with the heating member. The main casing includes: a first side plate having a first portion facing the fixing unit in the axial direction; and a second side plate having a second portion facing the fixing unit in the axial direction. The second side plate is positioned opposite the first side plate with respect to the fixing unit in the axial direction. The belt unit includes: an endless belt; a first pivot shaft; a first arm; a second pivot shaft; and a second arm. The belt is in contact with the photosensitive drum when the belt unit is in the internal position. The belt is separated from the photosensitive drum when the belt unit is in the external position. The first pivot shaft is supported at the first portion. The first arm is positioned opposite the fixing unit with respect to the first side plate in the axial direction. The first arm extends in a radial direction of the first pivot shaft. The first arm connects the first pivot shaft to the belt unit. The second pivot shaft is supported at the second portion. The second arm is positioned opposite the fixing unit with respect to the second side plate in the axial direction. The second arm extends in a radial direction of the second pivot shaft. The second arm connects the second pivot shaft to the belt unit.

BRIEF DESCRIPTION OF THE DRAWINGS

The particular features and advantages of the embodiment(s) as well as other objects will become apparent from the following description taken in connection with the accompanying drawings, in which:

FIG. 4A is a cross-sectional view of the cartridge taken along a line B-B in FIG. 3;

FIG. 4B is a cross-sectional view of the cartridge taken along the line B-B in FIG. 3 and showing a separated position of a developing unit;

DETAILED DESCRIPTION

Figure 1:
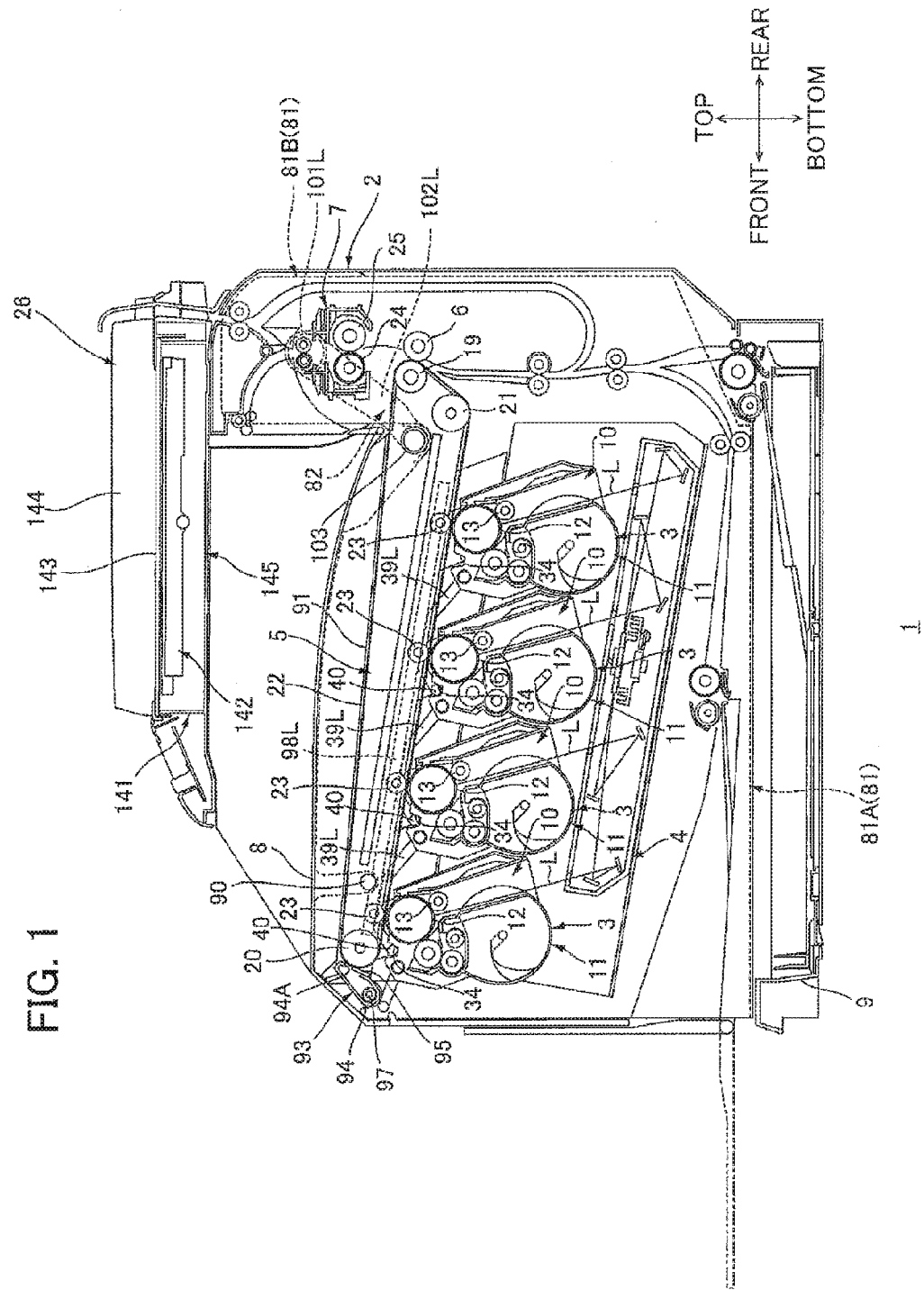
FIG. 1 is a central cross-sectional view of an image forming apparatus according to one embodiment.

An image filming apparatus 1 according to one embodiment will be described with reference to the accompanying drawings, wherein like parts and components are designated by the same reference numerals to avoid duplicating description. Directions referred to in the following description are based on directions indicated in the drawings.

1. Overall Structure of Image Forming Apparatus

As shown in FIG. 1, the image forming apparatus 1 is a laser printer. The image forming apparatus 1 includes a main casing 2 formed with an opening 2A (FIG. 10); a plurality of (four) cartridges 3; an exposure unit 4; a belt unit 5; a secondary transfer roller 6; a fixing unit 7; and a reading unit 26.

The main casing 2 is box-shaped, and is provided with a cover 8 and a supply tray 9.

Figure 10:
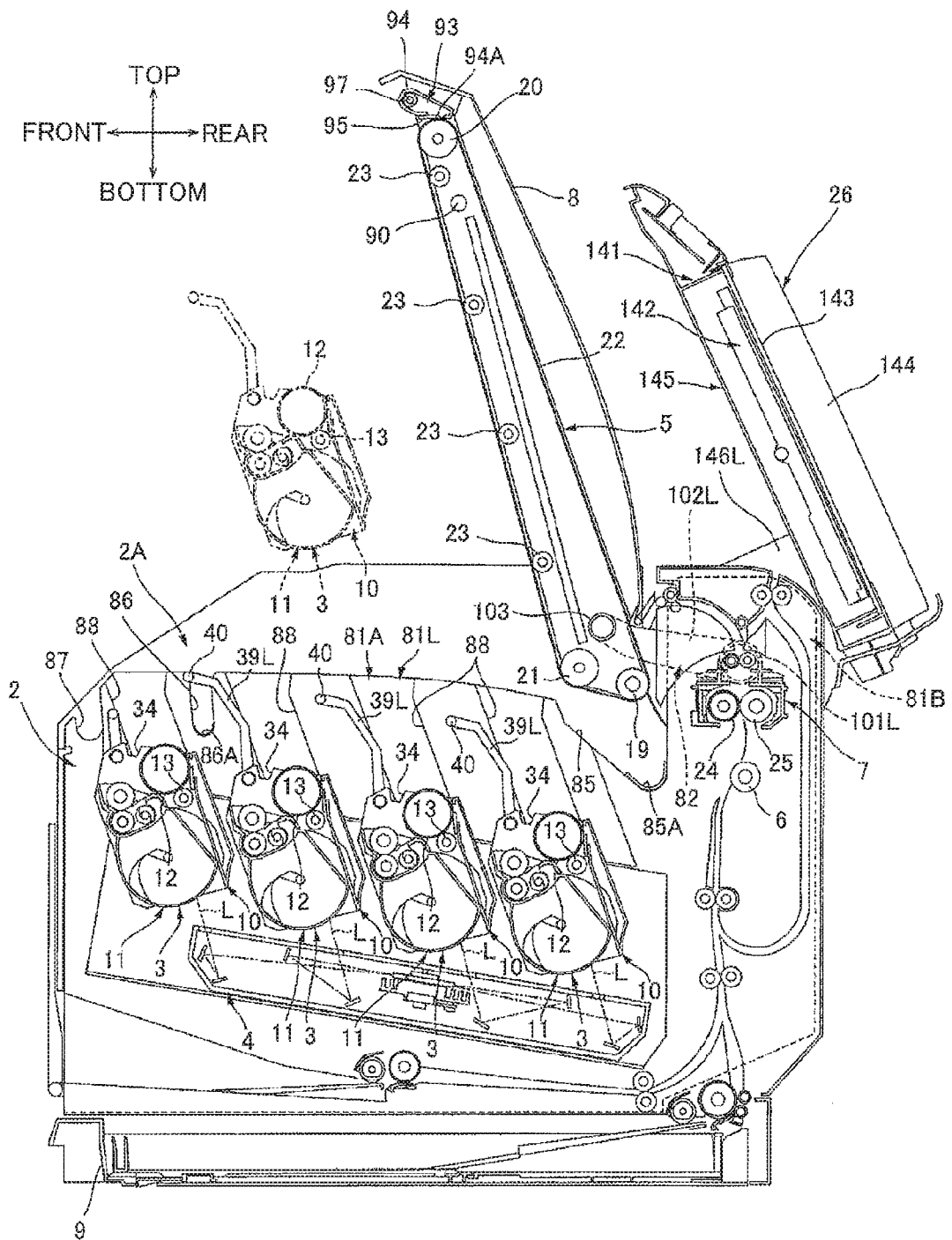
FIG. 10 is a central cross-sectional view of the image forming apparatus shown in FIG. 9.

As shown in FIG. 10, the opening 2A is positioned at an upper end portion of the main casing 2 to provide communication between an interior and exterior of the main casing 2 in a vertical direction. The opening 2A allows the plurality of cartridges 3 to pass therethrough.

As shown in. FIG. 1, the cover 8 is disposed at the upper end portion of the main casing 2. The cover 8 has a plate shape that extends in a front-rear direction. The cover 8 is pivotally movable together with the belt unit 5 about an axis of a first pivot shaft 101L and a second pivot shaft 101R of a pivot member 82 (described later) between an open position opening the opening 2A (FIG. 10) and a closed position closing the opening 2A (FIG. 1).

The supply tray 9 is disposed at a lower end portion of the main casing 2. The supply tray 9 is configured to accommodate sheets P.

Figure 2:
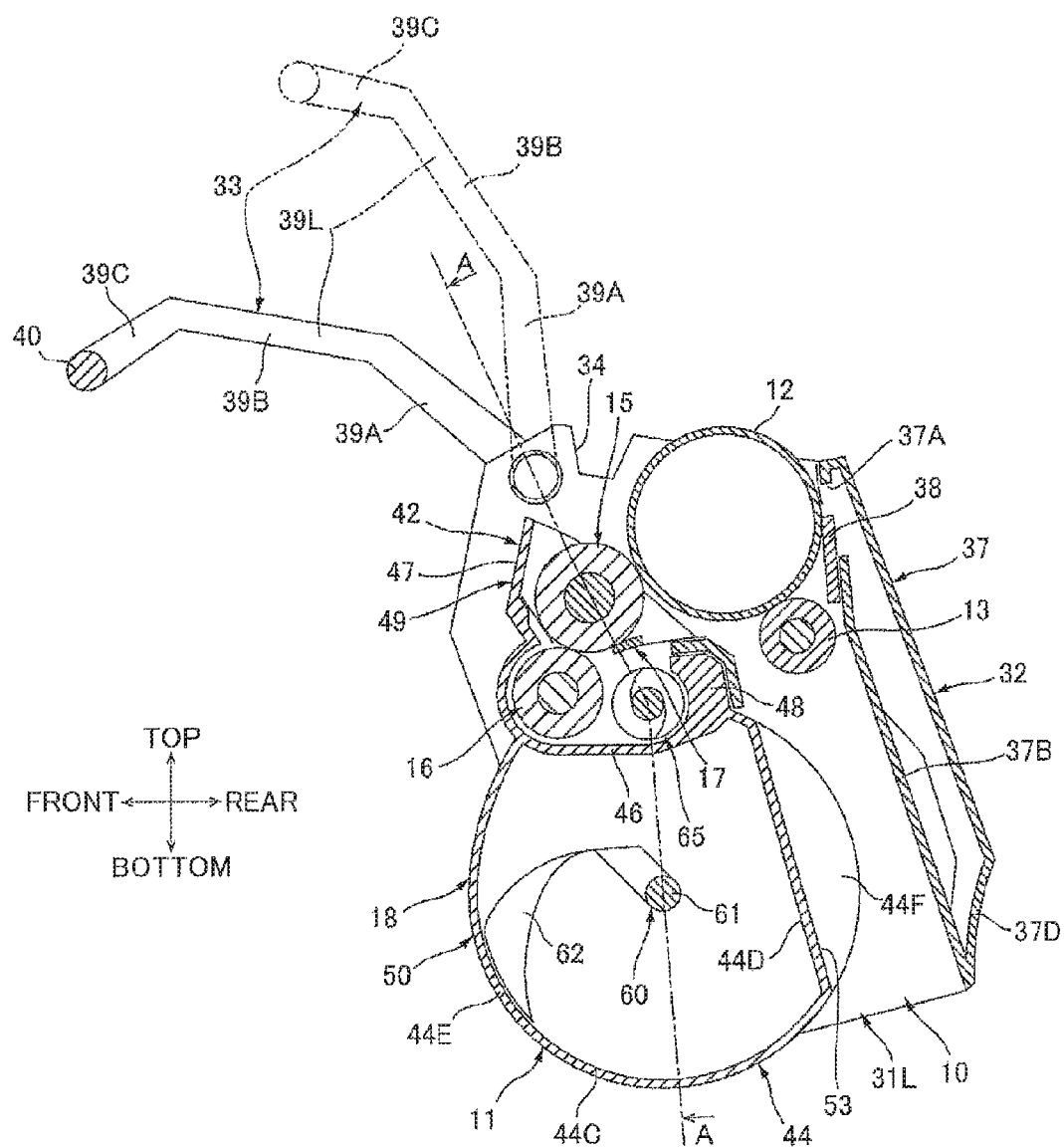
FIG. 2 is a central cross-sectional view of a cartridge in the image forming apparatus shown in FIG. 1.

The plurality of cartridges 3 is detachable from and attachable to the main casing 2. When attached to the main casing 2, the four cartridges 3 are arrayed in the front-rear direction (an example of a first direction) with a space between neighboring cartridges 3. Incidentally, any one of three cartridges 3 except for the frontmost cartridge 3 is an example of a first cartridge. Further, a cartridge 3 immediately forward of the first cartridge is an example of a second cartridge. That is, the four cartridges 3 include the first cartridge and the second cartridge. Each cartridge 3 can be detached from the main casing 2 to an outside through the opening 2A as shown in FIG. 10. As shown in FIG. 2, each of the four cartridges 3 includes a drum unit 10 and a developing unit 11.

The drum unit 10 includes a photosensitive drum 12 and a charging roller 13.

The photosensitive drum 12 is positioned at an upper end portion of the drum unit 10. The photosensitive drum 12 has a cylindrical shape that extends in a left-right direction (an example of an axial direction).

The charging roller 13 is positioned downward of the photosensitive drum 12. The charging roller 13 is in contact with a lower end portion of the photosensitive drum 12. The charging roller 13 is configured to charge a surface of the photosensitive drum 12.

The developing unit 11 is positioned, diagonally forward and downward of the photosensitive drum 12. The developing unit 11 includes a developing roller 15, a supply roller 16, a blade 17, and a toner chamber 18.

The developing roller 15 is positioned at an upper end portion of the developing unit 11. The developing roller 15 is in contact with a lower-front end portion of the photosensitive drum 12. The developing roller 15 is configured to supply toner to the photosensitive drum 12.

The supply roller 16 is positioned diagonally forward and downward of the developing roller 15. The supply roller 16 is in contact with a lower-front end portion of the developing roller 15. The supply roller 16 is configured to supply toner to the developing roller 15.

The blade 17 is positioned diagonally rearward and downward of the developing roller 15. The blade 17 is in contact with a lower-rear end portion of the developing roller 15. The blade 17 is configured to regulate a thickness of a toner layer formed over a surface of the developing roller 15.

The toner chamber 18 is positioned downward of the supply roller 16. The toner chamber 18 has a cylindrical shape that extends in the left-right direction. The toner chamber 18 is configured to accommodate therein toner.

As shown in FIG. 1, the exposure unit 4 is positioned downward of the four cartridges 3. The exposure unit 4 is configured to irradiate a laser beam L based on image data. The laser beam L is incident on the surface of each photosensitive drum 12, passing between the developing unit 11 and the corresponding charging roller 13.

The belt unit 5 is positioned upward of the four cartridges 3, and extends in the front-rear direction. The belt unit 5 includes a first roller 19 positioned at a rear end portion of the belt unit 5; a second roller 20 positioned at a front end portion of the belt unit 5; a third roller 21 positioned diagonally forward and downward of the first roller 19; a belt 22; and a plurality of (four) primary transfer rollers 23.

The belt 22 is an endless belt looped over the first roller 19, the second roller 20, and the third roller 21. The belt 22 has a lower portion that is in contact with the four photosensitive drums 12. The belt 22 is circularly movable around the first roller 19, the second roller 20, and the third roller 21 such that the lower portion of the belt 22 is moved rearward.

The four primary transfer rollers 23 are arrayed in the front-rear direction between the second roller 20 and the third roller 21, with a space between neighboring primary transfer rollers 23. The primary transfer rollers 23 are positioned upward of the corresponding photosensitive drums 12, with the belt 22 interposed therebetween.

The secondary transfer roller 6 is positioned rearward of the first roller 19. The secondary transfer roller 6 nips the belt 22 in cooperation with the first roller 19.

The fixing unit 7 is positioned upward of the secondary transfer roller 6. The fixing unit 7 includes a heating roller 24 as an example of a heating member, and a pressure roller 25 as an example of a pressure member in pressure contact with the beating roller 24.

The reading unit 26 is positioned above the main casing 2. More specifically, the reading unit 26 is positioned upward of the cover 8 with a gap therebetween. The reading unit 26 is a flat-bed type image scanner. The reading unit 26 is configured to read image data from an original document.

Upon start of an image-forming operation in the image forming apparatus 1, the exposure unit 4 irradiates the laser beam L, so that the surfaces of the photosensitive drums 12 are exposed to the laser beam L. Thus, electrostatic latent images based on image data are formed on the surfaces of the photosensitive drums 12, respectively.

Then, toner is supplied onto the electrostatic latent images on the surfaces of the photosensitive drums 12 by the corresponding developing rollers 15. Thus, toner images are carried on the surfaces of the photosensitive drains 12.

Then, the toner images on the surfaces of the photosensitive drums 12 are transferred onto the belt 22.

In the meantime, the sheets P are supplied from the supply tray 9 one at a prescribed timing to a position between the belt 22 and the secondary transfer roller 6. The toner image on the belt 22 is transferred onto the sheet P when the sheet P passes between the belt 22 and the secondary transfer roller 6.

Subsequently, the sheet P is heated and pressed when the sheet P passes between the heating roller 24 and the pressure roller 25. Thus, the toner image carried on the sheet P is thermally fixed to the sheet P.

Then, the sheet P is delivered onto the cover 8.

2. Developing Device (1) Drum Unit

Figure 3:
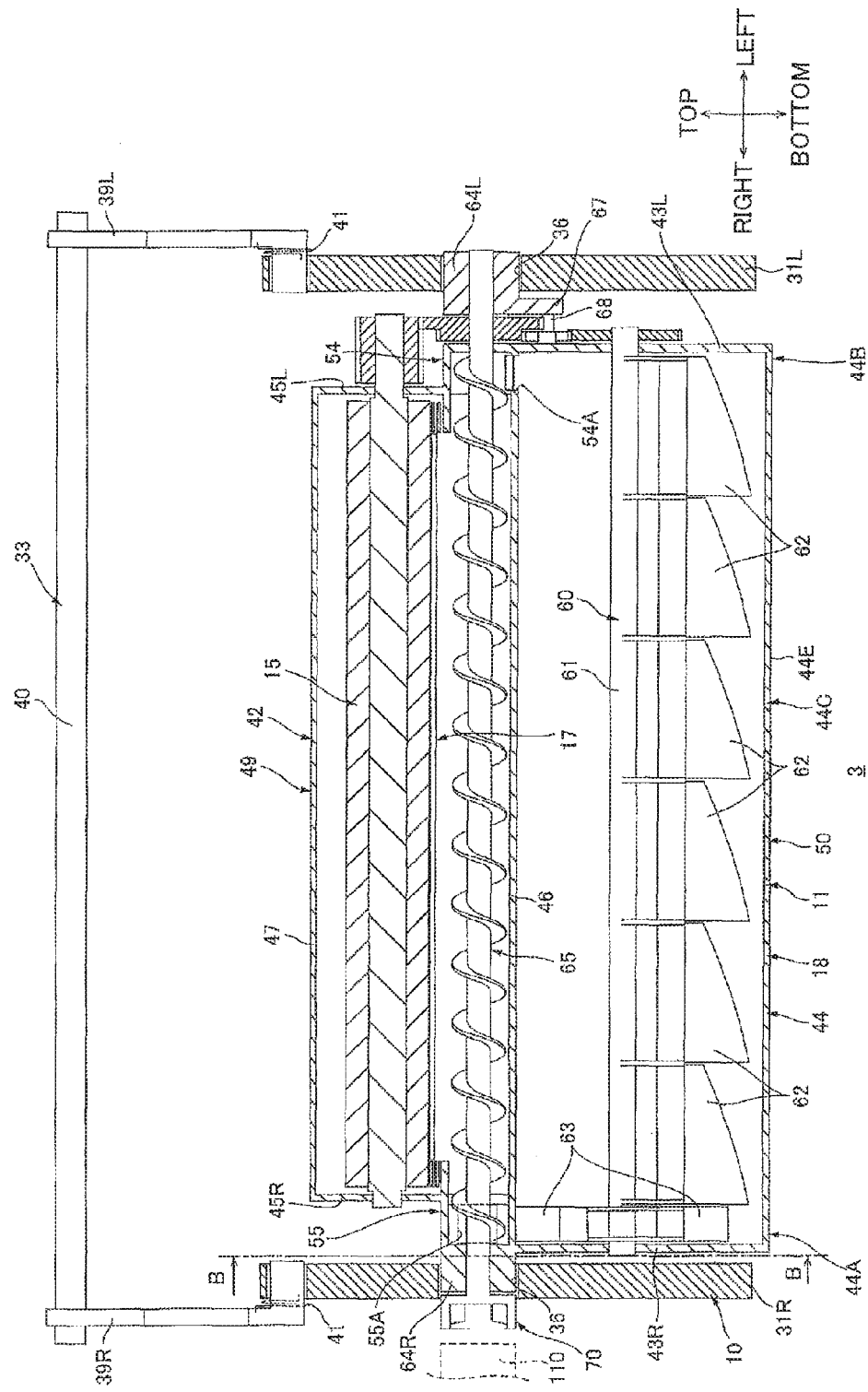
FIG. 3 is a cross-sectional view of the cartridge shown in FIG. 2 taken along a line A-A in FIG. 2.

As shown in FIGS. 2 and 3, the drum unit 10 includes a left side plate 31L, having a groove 34 and a hole 36 formed therein; a right side plate 31R having a groove 34 and a hole 36 formed therein; a drum cleaning unit 32; and a handle 33.

The left side plate 31L, is positioned at a left end portion of the drum unit 10. The left side plate 31L, has a rectangular shape in a side view. The left side plate 31L is elongated both in the vertical direction arid in the front-rear direction.

The groove 34 is formed in the left side plate 31L at a position diagonally above and forward of the photosensitive drum 12. The groove 34 is recessed downward from a top edge of the left side plate 31L. The groove 34 has a U-shape in a side view with a top opening.

The hole 36 is formed in the left side plate 31L at a position in a vertical center portion thereof and penetrates the left side plate 31L in the left-right direction. The hole 36 has a circular shape in a side view.

The right side plate 31R is positioned at a right end portion of the drum unit 10. The right side plate 31R has a rectangular Shape in a side view and is elongated both in the vertical direction and in the front-rear direction. The right side plate 31R has a configuration the same as the left side plate 31L.

The drum cleaning unit 32 is positioned rearward of the photosensitive drum 12 and the charging roller 13. The drum cleaning unit 32 includes an accommodating portion 37, and a cleaning member 38.

The accommodating portion 37 has a flattened box shape and is elongated both in the vertical direction and in the left-right direction. The accommodating portion 37 is positioned between the left side plate 31L and the right side plate 31R. The accommodating portion 37 includes a first opposing wall 37B having an opening 37A and a plurality of (two) recessed parts 37C (see FIG. 4A); and a second opposing wall 37D.

The first opposing wall 37B constitutes a front wall of the accommodating portion 37. The first opposing wall 37B extends linearly in a direction from upper front to lower rear.

The second opposing wall 37D constitutes a bottom wall of the accommodating portion 37. The second opposing wall 37D curves while extending in a direction from lower front to upper rear.

The opening 37A is positioned at a top end portion of the first opposing wall 37B. The opening 37A penetrates the top end portion of the opposing wall 37B in the front-rear direction. The opening 37A confronts a rear portion of a circumferential surface of the photosensitive drum 12.

The two recessed parts 37C include a left recessed part 37C (not shown) positioned at a left end portion of the accommodating portion 37, and a right recessed part 37C (see FIG. 4A) positioned at a right end portion of the accommodating portion 37. The two recessed parts 37C are positioned downward of the charging roller 13. The two recessed parts 37C are recessed rearward from a front surface of the accommodating portion 37.

The cleaning member 38 is positioned at a top end portion of the drum cleaning unit 32. The cleaning member 38 has a plate shape that is elongated both in the vertical direction and in the left-right direction. The cleaning member 38 is attached to a front surface of the first opposing wall 37B on a lower edge of the opening 37A. A top end portion of the cleaning member 38 is positioned within the opening 37A and contacts the rear portion of the circumferential surface of the photosensitive drum 12.

The handle 33 is positioned at atop end portion of the drum unit 10. The handle 33 is pivotally movable between an upright position (indicated by dashed lines in FIG. 2) extending vertically upward, and an inclined position (indicated by solid lines in FIG. 2) inclined forward from the upright position. The handle 33 is constantly urged toward the upright position by two coil springs 41. The following description of the handle 33 will be based on the handle 33 being in its upright position. The handle 33 includes a left arm 39L as an example of a third arm, a right arm 39R as an example of a fourth arm, and a connecting part 40.

The left arm 39L is positioned at a left end portion of the handle 33. The left arm 39L is elongated vertically. A bottom end portion of the left arm 39L is pivotally movably supported at an upper-front end portion of the left side plate 31L at a position forward of the groove 34. More specifically, the left arm 39L includes a first extension part 39A that extends upward from the upper-front end portion of the left side plate 31L, a second extension part 39B that extends diagonally upward and forward from a top end of the first extension part 39A, and a third extension part 39C that extends forward from an upper-front end of the second extension part 39B. When the left arm 39L is in its inclined position, the third extension part 39C extends downward toward front.

The right arm 39R is positioned at a right end portion of the handle 33. The right arm 39R has the same configuration as the left arm 39L. A bottom end portion of the right arm 39R is pivotally movably supported at an upper-front end portion of the right side plate 31R at a position forward of the groove 34.

The connecting part 40 is positioned at a top end portion of the handle 33. The connecting part 40 has a columnar shape that extends in the left-right direction. A left end portion of the connecting part 40 is connected to a distal end portion of the third extension part 39C of the left arm 39L while a right end portion of the connecting part 40 is connected to a distal end portion of the third extension pad 39C of the right arm 39R. In this way, the connecting part 40 connects the left arm 39L and the right arm 39R.

The two coil springs 41 include a left coil spring 41 wound about a pivot shaft of the left arm 39L, and a right coil spring 41 wound about a pivot shaft of the right arm 39R. One end of the left coil spring 41 is anchored on the left arm 39L, while the other end is anchored on the left side plate 31L. Similarly, one end of the right coil spring 41 is anchored on the right arm 39R, while the other end is anchored on the right side plate 31R.

(2) Developing Unit

The developing unit 11 is positioned between the left side plate 31L and the right side plate 31R. The developing unit 11 is pivotally movable between a contact position (see FIG. 4A) in which the developing roller 15 contacts the photosensitive drum 12, and a separated position (see FIG. 4B) in which the developing roller 15 is separated from the photosensitive drum 12. The following description of the developing unit 11 will be based on the developing unit 11 being in its contact position. Tension springs 30 (see FIG. 413) constantly urge the developing unit 11 toward its separated position. In addition to the toner chamber 18 described earlier, the developing unit 11 includes a developing chamber 42, a left pivot shaft 64L, and a right pivot shaft 64R.

(2-1) Developing Chamber

The developing chamber 42 is positioned at a top portion of the developing unit 11. The developing chamber 42 supports the developing roller 15, the supply roller 16, and the blade 17. The developing chamber 42 includes a first frame 49, and an auger screw 65.

(2-1-1) First Frame

The first frame 49 has a box shape with an upper-rear opening. The first frame 49 includes a right side wall 45R, a left side wall 45L, a bottom wall 46, a front wall 47, and a rear wall 48.

The right side wall 45R is positioned at a right end portion of the first frame 49. The right side wall 45R extends both in the vertical direction and in the front-rear direction. The right side wall 45R includes a toner supply part 55 having a supply opening 55A.

As shown in FIG. 3, the toner supply part 55 is positioned at the right end portion of the first frame 49. The toner supply part 55 protrudes rightward from a lower-rear end portion of the right side wall 45R. The toner supply part 55 is positioned further rightward than the supply roller 16. The toner supply part 55 has a cylindrical shape whose right end is closed. A left end of the toner supply part 55 is in communication with a lower-rear portion of an internal space defined by the first frame 49.

The supply opening 55A is positioned at a front end portion of the toner supply part 55. In other words, the supply opening 55A is positioned forward of the auger screw 65 and on a side the same as a side where the supply roller 16 is positioned relative to the auger screw 65. The supply opening 55A is positioned further rightward than the supply roller 16. The supply opening 55A is also positioned further rightward than the right side wall 45R. The supply opening 55A penetrates a front portion, of a circumferential wall of the toner supply part 55 in the front-rear direction.

The left side wall 45L is positioned at a left end portion of the first frame 49. The left side wall 45L extends both in the vertical direction and in the front-rear direction. The left side wall 45L includes a toner discharge part 54 having a discharge opening 54A.

Figure 8:
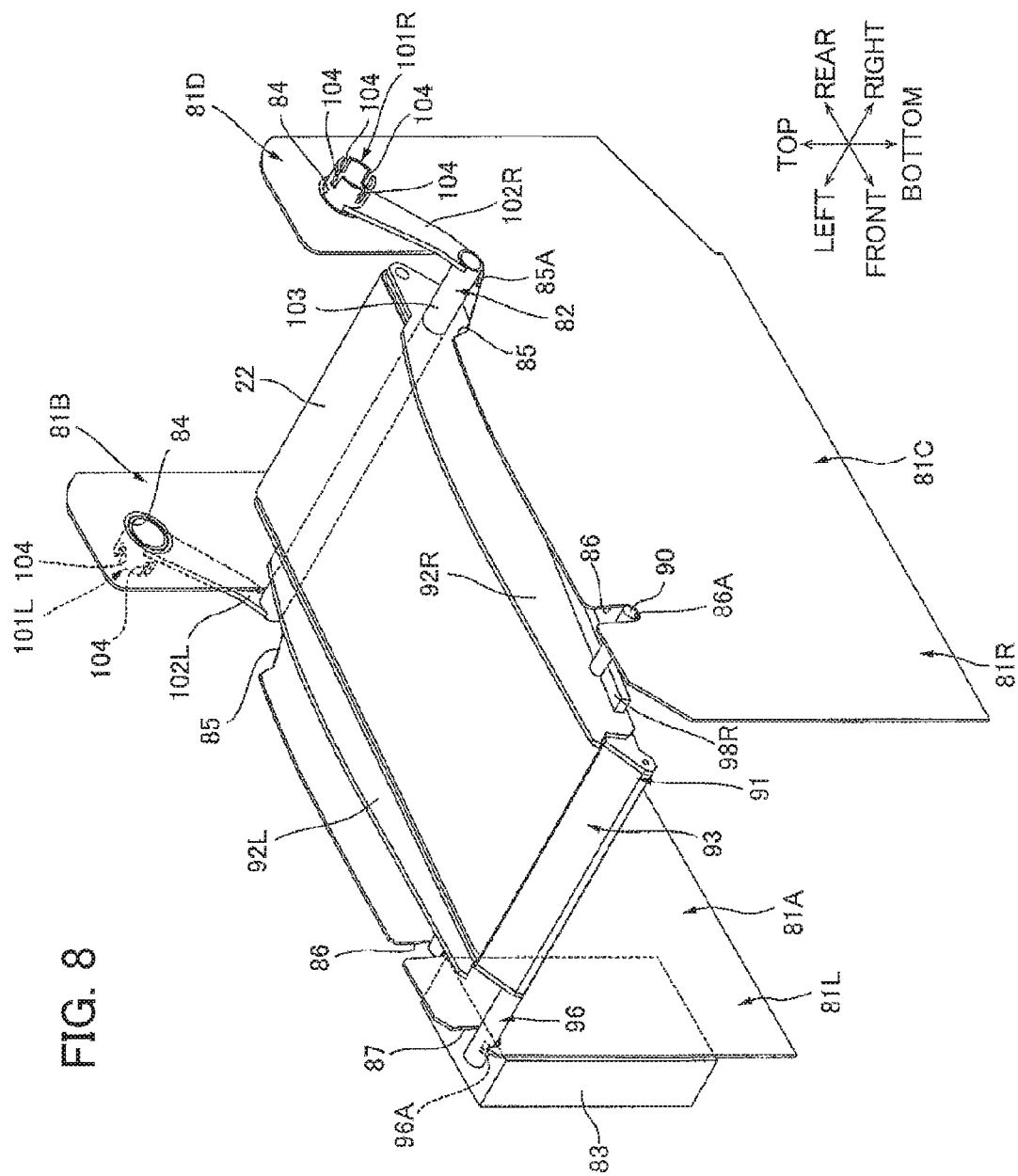
FIG. 8 is a view illustrating a configuration for supporting a belt unit in the image forming apparatus shown in FIG. 1.

As shown in FIGS. 3 and 8, the toner discharge part 54 is positioned at the left end portion of the first frame 49. The toner discharge part 54 protrudes leftward from a lower-rear end portion of the left side wall 45L. The toner discharge part 54 is positioned further leftward than the supply roller 16. The toner discharge part 54 has a cylindrical shape whose left end is closed. A right end of the toner discharge part 54 is in communication with the lower-rear portion of the internal space defined by the first frame 49.

The discharge opening 54A is positioned at a bottom end portion of the toner discharge part 54. The discharge opening 54A is positioned further leftward than the supply roller 16. The discharge opening 54A is also positioned further leftward than the left side wall 45L. The discharge opening 54A penetrates a bottom portion of a circumferential wall of the toner discharge part 54 in the vertical direction.

As shown in FIGS. 2 and 3, the bottom wall 46 is positioned at a bottom end portion, of the first frame 49. The bottom wall 46 is positioned between the left side wall 45L and the right side wall 45R. The bottom wall 46 extends both in the left-right direction and in the front-rear direction. A left edge of the bottom wall 46 is connected to a bottom edge of the left side wall 45L, while a right edge of the bottom wall 46 is connected to a bottom edge of the right side wall 45R.

The front wall 47 is positioned at a front end portion of the first frame 49. The front wall 47 extends upward from a front edge of the bottom wall 46. A left edge of the front wall 47 is connected to a front edge of the left side wall 45L, while a right edge of the front wall 47 is connected to a front edge of the right side wall 45R.

The rear wall 48 is positioned at a rear end portion of the first frame 49. The rear wall 48 extends upward from a rear edge of the bottom wall 46. A left edge of the rear wall 48 is connected to a rear edge of the left side wall 45L, while a right edge of the rear all 48 is connected to a rear edge of the right side wall 45R.

(2-1-2) Auger Screw

The auger screw 65 is accommodated in the lower-rear portion of the internal space defined by the first frame 49. The auger screw 65 is positioned rearward of the supply roller 16. The auger screw 65 is juxtaposed with the supply roller 16 in the front-rear direction (horizontally). The auger screw 65 extends in the left-right direction. The auger screw 65 includes a coupling 70.

The coupling 70 is positioned rightward of the right pivot shaft 64R. The coupling 70 is fixed to a right end portion of the auger screw 65. The coupling 70 can rotate together with the auger screw 65.

(2-2) Toner Chamber

The toner chamber 18 is positioned beneath the developing chamber 42. When viewed in the left-right direction, the toner chamber 18 is positioned opposite the developing chamber 42 with respect to the left pivot shaft 64L and the right pivot shaft 64R. The toner chamber 18 includes a second frame 50, and an agitator 60.

(2-2-1) Second Frame

The second frame 50 has a cylindrical shape that extends in the left-right direction. The second frame 50 has a left-right dimension greater than that of the first frame 49. The second frame 50 includes a left side wall 43L, a right side wall 43R, and a circumferential wall 44 having a recessed part 53.

The left side wall 43L is positioned at a left end portion of the toner chamber 18. The left side wall 43L is positioned further leftward than the left side wall 45L of the first frame 49. The left side wall 43L extends both in the vertical direction and in the front-rear direction. The left side wall 43L has a circular shape in a side view.

The right side wall 43R is positioned at a right end portion of the toner chamber 18. The right side wall 43R is positioned further rightward than the right side wall 45R of the first frame 49. The right side wall 43R extends both in the vertical direction and in the front-rear direction. The right side wall 43R has a circular shape in a side view.

The circumferential wall 44 is positioned between the left side wall 43L and the right side wall 43R. The circumferential wall 44 has a cylindrical shape. A left edge of the circumferential wall 44 is connected to an edge of the left side wall 43L, while a right edge of the circumferential wall 44 is connected to an edge of the right side wall 43R. The circumferential wall 44 includes a first circumferential wall 44A, a second circumferential wall 44B, and a third circumferential wall 44C.

The recessed part 53 is positioned at an intermediate portion of the circumferential wall 44 in the left-right direction. The recessed part 53 is recessed forward from a rear end portion of the circumferential wall 44. The recessed part 53 has a left-right dimension approximately equal to a left-right dimension of the developing chamber 42.

The first circumferential wall 44A constitutes a right end portion of the circumferential wall 44. The first circumferential wall 44A is positioned downward of the toner supply part 55. The first circumferential wall 44A has an arcuate shape that extends in a circumferential direction of the toner chamber 18. An upper edge of the first circumferential wall 44A is connected to the toner supply part 55.

The second circumferential wall 44B constitutes a left end portion of the circumferential wall 44. The second circumferential wall 44B is positioned downward of the toner discharge part 54. The second circumferential wall 44B has an arcuate shape that extends in the circumferential direction of the toner chamber 18. An upper edge of the second circumferential wall 44B is connected to the toner discharge part 54.

The third circumferential wall 44C is positioned between the first circumferential wall 44A and the second circumferential wall 44B. The third circumferential wall 44C is also positioned downward of the developing chamber 42. The third circumferential wall 44C includes a flat wall 44D as an example of a first wall, an arc wall 44E as an example of a second wall, and a plurality of (two) connecting walls 44F.

The flat wall 44D constitutes a rear wall of the third circumferential wall 44C. The flat wall 44D forms a bottom wall in the recessed part 53. The flat wall 44D extends linearly in a direction from lower rear to upper front. Hence, an inner surface of the flat wall 44D extends linearly. A top edge of the flat wall 44D is connected to a rear edge on a bottom end portion of the developing chamber 42.

The arc wall 44E constitutes bottom and front circumferential walls of the third circumferential wall 44C. The arc wall 44E has an arcuate shape that extends in the circumferential direction of the toner chamber 18. A rear edge of the arc wall 44E is connected to a bottom edge of the flat wall 44D, while a top edge of the arc wall 44E is connected to a lower-front edge of the developing chamber 42.

The two connecting walls 44F include a left connecting wall 44F (see FIG. 2) positioned at a left end portion of the third circumferential wall 44C, and a right connecting wall 44F (not shown) positioned on a right end portion of the third circumferential wall 44C. The left connecting wall 44F extends rearward from a left edge of the flat wall 44D and is connected to a right edge of the second circumferential wall 44B. The left connecting wall 44F constitutes a left wall of the recessed part 53. The right connecting wall 44F extends rearward from a right edge of the flat wall 44D and is connected to a left edge of the first circumferential wall 44A. The right connecting wall 44F constitutes a right wall of the recessed part 53.

(2-2-2) Agitator

The agitator 60 is positioned inside the second frame 50. The agitator 60 includes an agitator shaft 61, a plurality of (two) first blades 63, and a plurality of second blades 62.

The agitator shaft 61 is positioned in a radial center portion of the second frame 50. The agitator shaft 61 has a columnar shape that extends in the left-right direction. A left end portion of the agitator shaft 61 is rotatably supported at the left side wall 43L while a right end portion of the agitator shaft 61 is rotatably supported at the right side wall 43R.

The first blades 63 are positioned at a right end portion of the agitator 60. The first blades 63 are arranged at the same left-right position as the supply opening 55A. The first blades 63 are positioned inside the first circumferential wall 44A. The first blades 63 have a plate shape and extend from the agitator shaft 61 toward an inner surface of the first circumferential wall 44A. The two first blades 63 are disposed on opposite sides of the agitator shaft 61 in a radial direction of the toner chamber 18. The first blades 63 are formed of a flexible resin film.

The plurality of second blades 62 is positioned further leftward than the first blades 63. The second blades 62 are arrayed in the left-right direction. The second blades 62 are positioned inside the third circumferential wall 44C and the second circumferential wall 44B. The second blades 62 have a plate shape and extend from the agitator shaft 61 toward an inner surface of the circumferential wall 44. The second blades 62 are formed of the same flexible resin film as the first blades 63, but are thinner than the first blades 63.

(2-3) Pivot Shaft

The left pivot shaft 64L is positioned leftward of and spaced apart from the toner discharge part 54. The left pivot shaft 64L has a columnar shape that is elongated in the left-right direction. The left pivot shaft 64L is rotatably fitted into the hole 36 formed in the left side plate 31L. Thus, the left pivot shaft 64L is pivotally movably supported at the left side plate 31L. The left pivot shaft 64L includes an extension part 67, and leg parts 68.

The extension part 67 is positioned at a lower end portion of the left pivot shaft 64L. The extension part 67 has a plate shape that is elongated in the vertical direction. A top edge of the extension part 67 is connected to a right end potion of the left pivot shaft 64L.

The leg parts 68 are positioned between the extension part 67 and the left side wall 43L. The leg parts 68 have a plate shape that is elongated in the left-right direction. Left edges of the leg parts 68 are connected to a bottom edge of the extension part 67, while right edges of the leg parts 68 are connected to a left surface of the left side wall 43L.

The right pivot shaft 64R is positioned rightward of the toner supply part 55. The right pivot shaft 64R has a columnar shape that is elongated in the left-right direction. A left end of the right pivot shaft 64R is connected to the right wall of the toner supply part 55. The right pivot shaft 64R is rotatably fitted into the hole 36 formed in the right side plate 31R. Thus, the right pivot shaft 64R is pivotally movably supported at the right side plate 31R.

By rotatably fitting the left pivot shaft 64L into the hole 36 of the left side plate 31L and the right pivot shaft 64R into the hole 36 of the right side plate 31R, the developing unit 11 is capable of pivotally moving.

3. Main Casing

Figure 5:
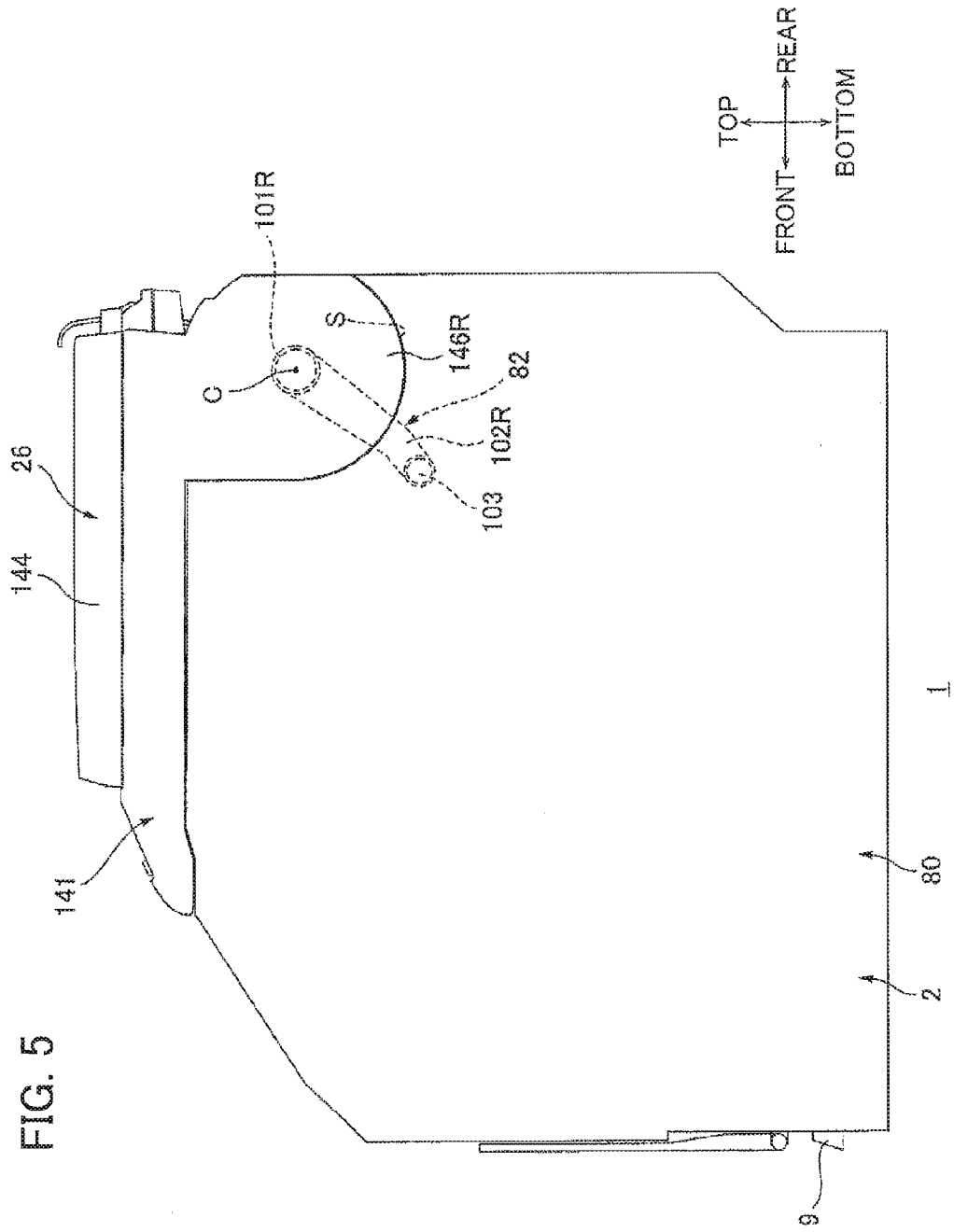
FIG. 5 is a right side view of the image forming apparatus shown in FIG. 1.

As shown in FIGS. 5 and 8, the main casing 2 includes a casing 80, a first side plate 81L, a second side plate 81R, and an accommodating part 83 for accommodating waste toner.

The casing 80 constitutes an exterior of the main casing 2. The casing 80 has a box shape. The casing 80 is formed of resin, for example.

As shown in FIG. 8, the first side plate 81L is positioned inside the casing 80 and at a left end portion thereof. The first side plate 81L is elongated both in the vertical direction and in the front-rear direction. The first side plate 81L is formed of metal, such as steel or stainless steel. The first side plate 81L includes a main part 81A as an example of a third part, and a protruding part 81B as an example of a first part.

As shown in FIGS. 1 and 8, the main part 81A is positioned leftward of the four cartridges 3 and the exposure unit 4. That is, the main part 81A confronts the cartridges 3 in the left-right direction. The main part 81A has a general rectangular shape in a side view. The main part 81A includes a support part 85 for supporting a connecting shaft 103 described later, a groove 86 for supporting a shaft 90 described later, a groove 87 for receiving a conveying tube 96 described later, and a plurality of (four) guides 88 (see FIG. 10).

As shown in FIG. 10, the support part 85 is formed in a top edge of the main part 81A at a rear end portion thereof. The support part 85 is recessed downward from the top edge of the main part 81A. The support part 85 has a V-shape with a top opening. The support part 85 includes a cushioning member 85A.

The cushioning member 85A is positioned within the support part 85 at a bottom end portion thereof. The cushioning member 85A extends along an inner surface of the bottom end portion of the support part 85. The cushioning member 85A is formed of rubber, but may be formed of resin instead.

The groove 86 is formed in the top edge of the main part 81A at a front end portion thereof. The groove 86 is recessed downward from the top edge of the main part 81A. The groove 86 has a U-shape with a top opening. The groove 86 includes a cushioning member 86A.

The cushioning member 86A is positioned within the groove 86 at a bottom end portion thereof. The cushioning member 86A extends along an inner surface of the bottom end portion of the groove 86. The cushioning member 86A is formed of rubber, but may be formed of resin instead.

The groove 87 is positioned forward of the groove 86. The groove 87 is recessed downward from the top edge of the main part 81A. The groove 87 has a U-shape with a top opening.

The guides 88 are positioned on an inner surface (right surface) of the first side plate 81L. The guides 88 have a U-shape in a side view with a top opening. The guides 88 extend in a direction from upper front to lower rear. That is, the guides 88 slope forward toward top. The guides 88 guide the cartridges 3 when the cartridges 3 are mounted in and removed from the main casing 2. Four guides 88 are arrayed at intervals in the front-rear direction.

As shown in FIGS. 1 and 8, the protruding part 81B is positioned at an upper-rear end portion of the first side plate 81L. The protruding part 81B is positioned leftward of the fixing unit 7. That is, the protruding part 81B confronts the fixing unit 7 in the left-right direction. The protruding part 81B supports a left end portion of the fixing unit 7. The protruding part 81B is also positioned rearward of the support part 85. The protruding part 81B extends upward from an upper-rear end portion of the main part 81A. The protruding part 81B has a general rectangular shape in a side view. The protruding part 81B has a shaft insertion hole 84.

The shaft insertion hole 84 is positioned at a center portion of the protruding part 81B. The shaft insertion hole 84 penetrates the protruding part 81B in the left-right direction. The shaft insertion hole 84 has a circular shape in a side view.

The second side plate 81R is positioned inside the casing 80 and at a right end portion thereof. The second side plate 81R is positioned opposite the first side plate 81L with respect to the fixing unit 7 in the left-right direction. The second side plate 81R has the same shape as the first side plate 81L except that the groove 87 is not formed. The second side plate 81R is formed of the same material as the first side plate 81L. The second side plate 81R includes a main part 81C as an example of a fourth part, and a protruding part 81D as an example of a second part.

The main part 81C is positioned rightward of the four cartridges 3 and the exposure unit 4. That is, the main part 81C confronts the cartridges 3 in the left-right direction. The main part 81C supports the exposure unit 4 in cooperation with the main part 81A of the first side plate 81L.

The protruding part 81D is positioned rightward of the fixing unit 7. That is, the protruding part 81D confronts the fixing unit 7 in the left-right direction. The protruding part 81D supports a right end portion of the fixing unit 7.

The accommodating part 83 is positioned leftward of the first side plate 81L at a front end portion thereof. The accommodating part 83 has a box shape.

4. Belt Unit

The belt unit 5 is pivotally movably supported at the protruding part 81B of the first side plate 81L and the protruding part 81D of the second side plate 81R. The belt unit 5 is movable between an internal position (see FIG. 1) in which the belt 22 contacts the photosensitive drums 12, and an external position (see FIG. 10) in which the belt 22 is separated from the photosensitive drums 12 and moved outward of the main casing 2 through the opening 2A. The following description of the belt unit 5 will be based on the belt unit 5 being in its internal position. The belt unit 5 includes a frame 91, a left side plate 92L, a right side plate 92R, the shaft 90, and the pivot member 82.

(1) Frame

The frame 91 supports the belt 22, the first roller 19, the second roller 20, the third roller 21, and the plurality of primary transfer rollers 23. The frame 91 has a frame-like structure that surrounds left, right, and front end portions of the belt 22. The frame 91 includes a belt cleaning unit 93.

The belt cleaning unit 93 is positioned at a front end portion of the frame 91. The belt cleaning unit 93 is configured to clear, the belt 22. The belt cleaning unit 93 includes an accommodating part 94 having an opening 94A; a cleaning member 95; the conveying tube 96 having a discharge opening 96A; and an auger screw 97.

The accommodating part 94 has a box shape that is elongated in the left-right direction. The accommodating part 94 accommodates waste toner that has been cleaned off the belt 22 by the cleaning member 95.

The opening 94A is positioned at a top end portion of the accommodating part 94. The opening 94A penetrates a rear wall of the accommodating part 94 in the front-rear direction. The opening 94A confronts a front end portion of the belt 22.

The cleaning member 95 is positioned at a top end portion of the belt cleaning unit 93. The cleaning member 95 has a plate shape that is elongated both in the vertical direction and in the left-right direction. The cleaning member 95 is attached to a rear surface of the accommodating part 94 on a lower edge of the opening 94A. A top edge of the cleaning member 95 is positioned within the opening 94A and contacts a front end portion of an outer peripheral surface of the belt 22. The cleaning member 95 is configured to clean the outer peripheral surface of the belt 22 by removing waste toner adhering to the outer peripheral surface of the belt 22.

The conveying tube 96 extends leftward from a left surface of the frame 91 at a front end portion thereof. The conveying tube 96 has a cylindrical shape whose left end is closed. A right end of the conveying tube 96 is in communication with a bottom end portion of the accommodating part 94. The conveying tube 96 is fitted into the groove 87 formed in the main part 81 A. Note that an outer circumferential surface of the conveying tube 96 is spaced apart from an inner surface of the groove 87 when fitted into the groove 87.

The discharge opening 96A is positioned at a left end portion of the conveying tube 96. The discharge opening 96A is leftward of the first side plate 81L. That is, the discharge opening 96A is positioned opposite the fixing unit 7 with respect to the first side plate 81L in the left-right direction. The discharge opening 96A penetrates a bottom end portion of a circumferential wall of the conveying tube 96 in the vertical direction. The discharge opening 96A has a rectangular shape in a bottom view. Waste toner accommodated in the accommodating part 94 is discharged into the accommodating part 83 through the discharge opening 96A.

The auger screw 97 is positioned at a bottom end portion of the accommodating part 94 and inside the conveying tube 96. The auger screw 97 extends in the left-right direction. The auger screw 97 is configured to convey waste toner accommodated in the accommodating part 94 toward the discharge opening 96A.

(2) Side Plates

The right side plate 92R is fixed to a right surface of the frame 91. The right side plate 92R has a plate shape that is elongated in the front-rear direction. The right side plate 92R includes a second contact part 98R.

The second contact part 98R protrudes rightward from a right surface of the right side plate 92R. Hence, the second contact part 98R is positioned further rightward than the belt 22. The second contact part 98R has a plate shape that is elongated in the front-rear direction.

The left side plate 92L is fixed to a left surface of the frame 91. The left side plate 92L has the same shape as the right side plate 92R. The left side plate 92L includes a first contact part 98L (see FIG. 1) having the same shape as the second contact part 98R of the right side plate 92R. The first contact part 98L protrudes leftward from a left surface of the left side plate 92L. The first contact part 98L is positioned further leftward than the belt 22.

(3) Shaft

The shaft 90 is positioned rearward of the belt cleaning unit 93. The shaft 90 has a columnar shape that extends in the left-right direction. The shaft 90 penetrates the frame 91, the left side plate 92L, and the right side plate 92R in the left-right direction, and is inserted through a loop formed by the belt 22.

A left end portion of the shaft 90 protrudes further leftward than the left side plate 92L and is fitted into the groove 86 formed in the first side plate 81L. In a state where the shaft 90 is fitted into the groove 86 of the first side plate 81L, an outer circumferential surface of the shaft 90 contacts the cushioning member 86A but is spaced apart from an inner surface of the groove 86.

Similarly, a right end portion of the shaft 90 protrudes further rightward than the right side plate 92R and is fitted into the groove 86 formed in the second side plate 81R. In a state where the shaft 90 is fitted into the groove 86 of the second side plate 81R, the outer circumferential surface of the shaft 90 contacts the cushioning member 86A but is spaced apart from an inner surface of the groove 86.

With this configuration, the front end portion of the belt unit 5 is supported at the main part 81A of the first side plate 81L and the main part 81C of the second side plate 81R.

(4) Pivot Member

The pivot member 82 is positioned at an upper-rear end portion of the belt unit 5. The pivot member 82 includes the first pivot shaft 101L having a plurality of (four) engaging grooves 104; the second pivot shaft 101R having a plurality of (four) engaging grooves 104; a first arm 102L; a second arm 102R; and the connecting shaft 103.

The first pivot shaft 101L is rotatably inserted through the shaft insertion hole 84 formed in the first side plate 81L. With this arrangement, the first pivot shaft 101L is supported at the protruding part 81B of the first side plate 81L. Further, the first pivot shaft 101L is positioned upward of the belt unit 5 and downward of the reading unit 26. The first pivot shaft 101L has a cylindrical shape that extends in the left-right direction. The first pivot shaft 101L protrudes further leftward than a left surface of the first side plate 81L.

The four engaging grooves 104 are arranged at intervals in a circumferential direction of the first pivot shaft 101L. The engaging grooves 104 are recessed rightward from a left edge of the first pivot shaft 101L. The engaging grooves 104 have a U-shape whose left end is open.

The second pivot shaft 101R is rotatably inserted through the shaft insertion hole 84 formed in the second side plate 81R. With this arrangement, the second pivot shaft 101R is supported at the protruding part 81D of the second side plate 81R. The second pivot shaft 101R has the same shape as the first pivot shaft 101L. The second pivot shaft 101R protrudes further rightward than a right surface of the second side plate 81R.

The first arm 102L is positioned diagonally forward and downward of the first pivot shaft 101L. The first arm 102L is also positioned leftward of the protruding part 81B. That is, the first arm 102L is positioned opposite the fixing unit 7 with respect to the first side plate 81L in the left-right direction. The first arm 102L extends in a direction from lower front to upper rear. In other words, the first arm 102L extends in a radial direction of the first pivot shaft 101L. The first arm 102L has a plate shape. A lower-front end portion of the first arm 102L is connected to a left end portion of the connecting shaft 103, while an upper-rear end of the first arm 102L is connected to a right end portion of the first pivot shaft 101L.

The second arm 102R is positioned diagonally forward and downward of the second pivot shaft 101R. The second arm 102R is also positioned rightward of the protruding part 81D. That is, the second arm 102R is positioned opposite the fixing unit 7 with respect to the second side plate 81R in the left-right direction. The second arm 102R extends in a direction from lower front to upper rear. In other words, the second arm 102R extends in a radial direction of the second pivot shaft 101R. The second arm 102R has a plate shape. A lower-front end portion of the second arm 102R is connected to a right end portion of the connecting shaft 103, while an upper-rear end portion of the second arm 102R is connected to a left end portion of the second pivot shaft 101R.

The connecting shaft 103 has a columnar shape that extends in the left-right direction. The connecting shaft 103 is fixed to a rear end portion of the belt unit 5. The connecting shaft 103 penetrates the frame 91, the left side plate 92L, and the right side plate 92R in the left-right direction so as to pass through the loop formed by the belt 22.

A left end portion of the connecting shaft 103 protrudes further leftward than the left side plate 92L and is fitted into the support part 85 formed in the first side plate 81L. In a state where the connecting shaft 103 is fitted into the support part 85 of the first side plate 81L, an outer circumferential surface of the connecting shaft 103 contacts the cushioning member 85A but is spaced apart from an inner surface of the support part 85.

Similarly, a right end portion of the connecting shaft 103 protrudes further rightward than a right side plate 92R and is fitted into the support part 85 formed in the second side plate 81R. In a state where the connecting shaft 103 is fitted into the support part 85 of the second side plate 81R, the outer circumferential surface of the connecting shaft 103 contacts the cushioning member 85A but is spaced apart from an inner surface of the support part 85.

With this configuration, the rear end portion of the belt unit 5 is supported at the main part 81A of the first side plate 81L and the main part 81C of the second side plate 81R.

5. Reading Unit

As shown in FIG. 1, the reading unit 26 includes a frame 141, an optical system 142, a transparent plate 143, and a cover 144.

Figure 6:
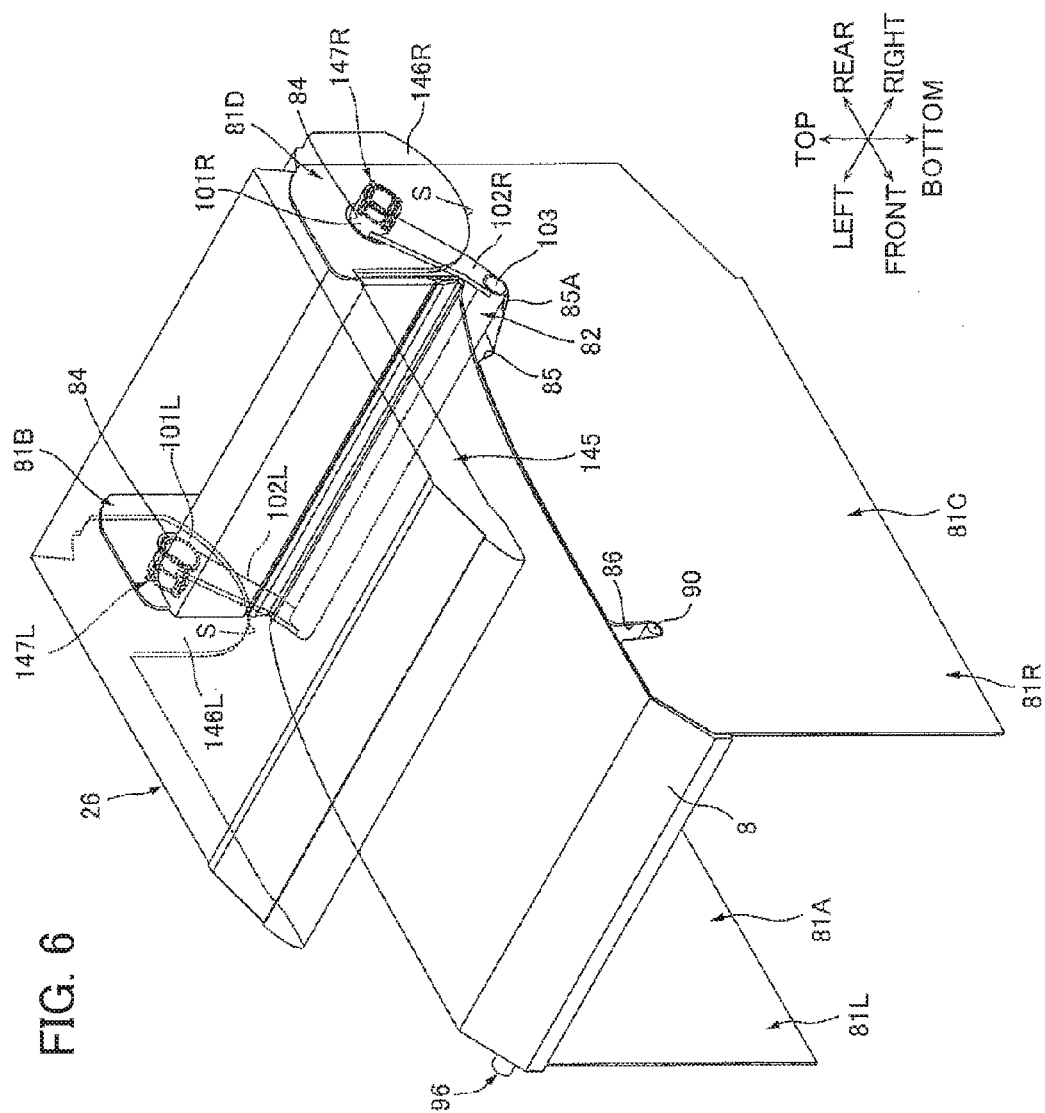
FIG. 6 is a view illustrating a configuration for supporting a reading unit in the image forming apparatus shown in FIG. 1.

As shown in FIGS. 5 and 6, the frame 141 includes an accommodating part 145, a first connecting part 146L, and a second connecting part 146R.

The accommodating part 145 has a flattened box shape that is elongated in the front-rear direction.

Figure 7:
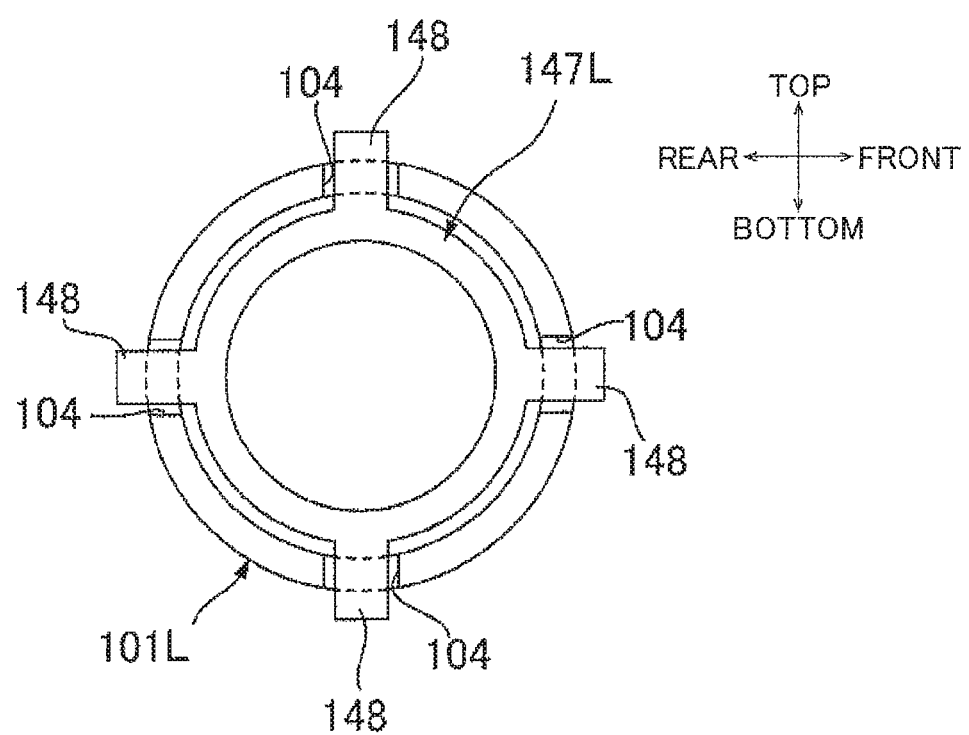
FIG. 7 is a view illustrating an engagement structure between a first pivot shaft and a first connecting portion shown in FIG. 6.

As shown in FIGS. 6 and 7, the first connecting part 146L extends downward at a left end portion of the frame 141. The first connecting part 146L has a plate shape. A bottom peripheral surface S of the first connecting part 146L has an arc shape centered on a pivot center C of the pivot member 82. The first connecting part 146L includes an engaging part 147L.

The engaging part 147L is positioned at a center portion the first connecting part 146L. The engaging part 147L extends rightward from a right surface of the first connecting part 146L. The engaging part 147L has a cylindrical shape. The engaging part 147L is fitted into the first pivot shaft 101L of the pivot member 82. The engaging part 147L is provided with a plurality of (four) ribs 148.

The four ribs 148 are arranged at intervals in a circumferential direction of the engaging part 147L. The ribs 148 protrude radially outward from a circumferential surface of the engaging part 147L. The ribs 148 have a plate shape that is elongated in the left-right direction. The ribs 148 are fitted into the engaging grooves 104 formed in the first pivot shaft 101L of the pivot member 82. This arrangement enables the first connecting part 146L to be connected to the first pivot shaft 101L and to rotate together with the first pivot shaft 101L.

The second connecting part 146R extends downward at a right end portion of the frame 141. The second connecting part 146R has the same configuration as the first connecting part 146L. The second connecting part 146R includes an engaging part 147R. Fitting the engaging part 147R of the second connecting part 146R into the second pivot shaft 101R of the pivot member 82 enables the second connecting part 146R to be connected to the second pivot shaft 101R and to rotate together with the second pivot shaft 101R.

As shown in FIG. 1, the optical system 142 is positioned inside the frame 141. The optical system 142 includes a light source and an imaging element.

The transparent plate 143 is positioned upward of the optical system 142 of the frame 141. The transparent plate 143 is supported at a top wall of the frame 141. The transparent plate 143 is formed of a transparent glass plate or the like.

The cover 144 is positioned upward of the frame 141. The cover 144 has a plate shape that is elongated both in the front-rear direction and in the vertical direction. The cover 144 is pivotally movably supported at its rear end portion on a rear end portion of the frame 141.

6. Operations for Mounting Cartridges in and Removing Cartridges from Main Casing Next, operations for mounting the cartridges 3 in the main casing 2 and for removing the cartridges 3 from the main casing 2 will be described with reference to FIGS. 1 and 10.

(1) Mounted State of Cartridge

When the cartridges 3 are mounted in the main casing 2 and the belt unit 5 is in its internal position, as shown in FIG. 1, the handles 33 are in their inclined position. At this time, the left arm 39L of each handle 33 is positioned between the first side plate 81L and the left side plate 92L of the belt unit 5, while the right arm 39R of the handle 33 is positioned between the second side plate 81R and the right side plate 92R of the belt unit 5.

Further, the first contact part 98L of the belt unit 5 contacts the second extension part 39B of the left arm 39L of each handle 33. Similarly, the second contact part 98R (see FIG. 8) of the belt unit 5 contacts the second extension part 39B of the right am 39R (see FIG. 3) of each handle 33.

In this state, the connecting part 40 of the handle 33 of one cartridge 3 (first cartridge) is fitted in the groove 34 formed in another cartridge 3 (second cartridge) immediately forward of the first cartridge. In other words, the groove 34 of the second cartridge receives the connecting part 40 of the first, cartridge immediately rearward of the second cartridge. At this time, the connecting part 40 is in its first position. The connecting part 40 of the first cartridge is positioned within a mounting-removing path of the second cartridge along which the second cartridge is mounted in and removed from the main casing 2.

Also in this state, the connecting part 40 of one cartridge 3 (first cartridge) is positioned further forward than the photosensitive drum 12 of another cartridge 3 (second cartridge) immediately forward of the first cartridge. In other words, the connecting part 40 is separated farther from the photosensitive drum 12 of the first cartridge than the photosensitive drum 12 of the second cartridge in the front-rear direction.

Further, the left arm 39L and the right arm 39k of the handle 33 overlap the belt 22 when viewed in the left-right direction.

In this state, couplings 110 provided in the main casing 2, as shown in FIG. 3, are fitted into the couplings 70 of the corresponding developing units 11 so as to be incapable of rotating relative thereto.

While the couplings 110 are not rotated in this state, the developing units 11 are maintained in the separated position by the urging force of the tension springs 30, as shown in FIG. 4B.

At this time, a rear end portion of the first circumferential wall 44A of the toner chamber 18 of each developing unit 11 is positioned inside the right recessed part 37C formed in the drum cleaning unit 32. Further, a rear end portion of the second circumferential wall 44B of the toner chamber 18 of developing unit 11 is positioned inside the left recessed parts 37C formed in the drum cleaning unit 32.

When the image-forming operation described above is executed, each coupling 110 rotates, and the coupling 70 and the auger screw 65 of the corresponding developing unit 11 rotate in response to the rotation of the coupling 110. That is, the coupling 70 transmits a drive force from the coupling 110 to the auger screw 65.

In this way, the drive force of the coupling 110 is inputted into the corresponding developing unit 11.

Then, torque of the coupling 110 causes the developing unit 11 to move to the contact position against the urging force of the tension springs 30, as shown in FIG. 4A.

At this time, the flat wall 44D of the third circumferential wall 44C of the toner chamber 18 is substantially parallel to the first opposing wall 37B of the drum cleaning unit 32 while remaining separated therefrom, as illustrated in FIG. 2.

As shown in FIG. 1, a laser beam L emitted from the exposure unit 4 passes through a gap between the flat wall 44D and the first opposing wall 37B and is incident on the photosensitive drum 12. In other words, when the developing unit 11 is in its contact position, the toner chamber 18 is retracted forward from a path of the laser beam L, and the flat wall 44D extends alongside the path of the laser beam L.

Further, a front end portion of the arc wall 44E of the third circumferential wall 44C of the toner chamber 18 in one cartridge 3 confronts the second opposing wall 37D of the drum cleaning unit 32 in another cartridge 3 immediately forward of the one cartridge 3, as illustrated in FIG. 1. When viewed in a mounting-removing direction of the cartridge 3, i.e., in a direction from upper front to lower rear, the toner chamber 18 of the one cartridge 3 (first cartridge) overlaps the drum unit 10 of the another cartridge 3 (second cartridge) immediately forward of the first cartridge.

Thus, when the developing unit 11 is in the contact position, the toner chamber 18 of one cartridge 3 (first cartridge) is disposed at a position that interferes with the drum cleaning unit 32 of another cartridge 3 (second cartridge) immediately forward of the first cartridge, thereby restricting the cartridge 3 (first cartridge) from being removed from the main casing 2.

(2) Removing Cartridge

Figure 9:
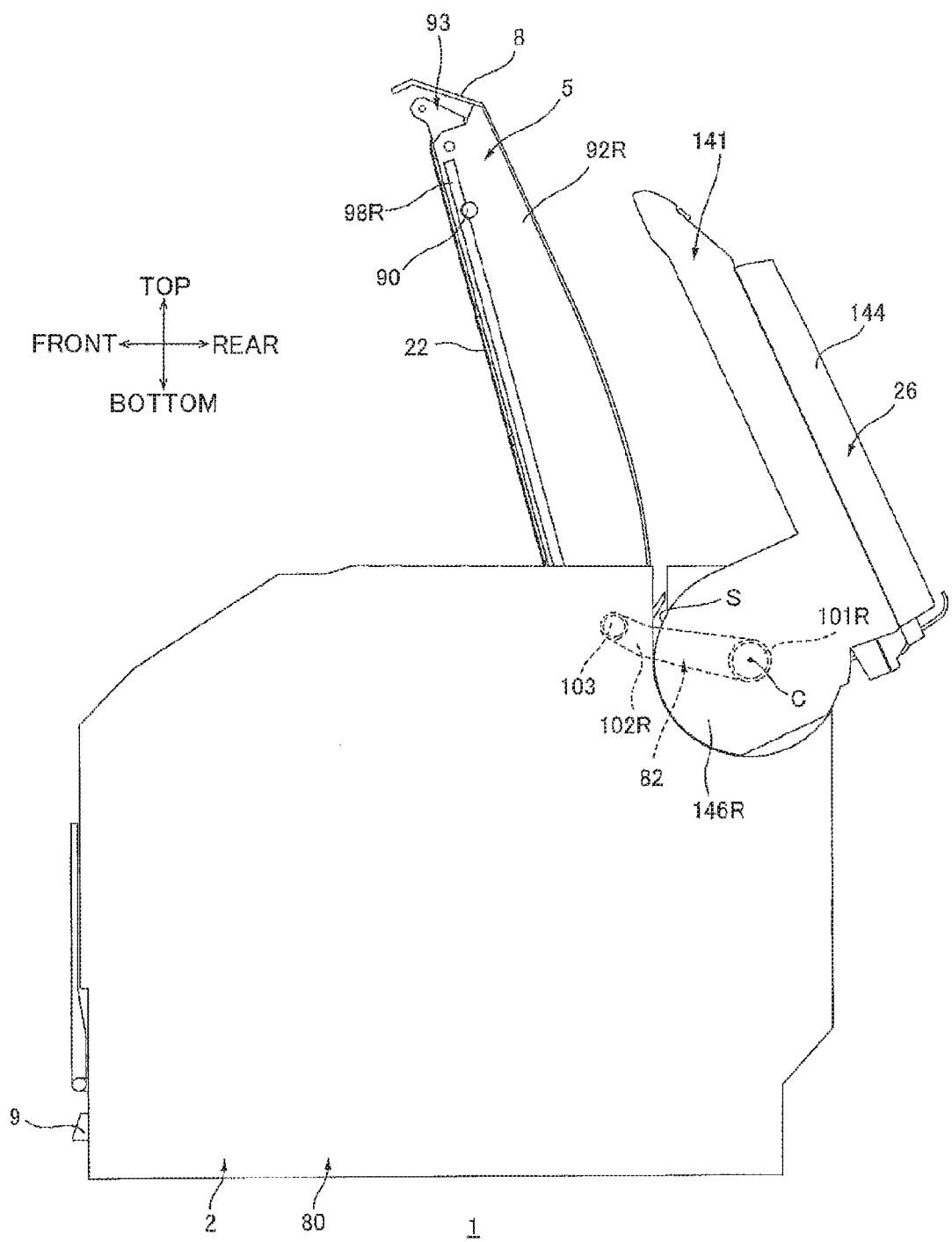
FIG. 9 is a view illustrating a state of the image forming apparatus shown in FIG. 5 where a cover is in an open position and the belt unit is in an external position.

To remove any of the cartridges 3 from the main casing 2, a user lifts the cover 8 of the main casing 2 upward, as shown in FIGS. 9 and 10.

At this time, the cover 8 is pivotally moved together with the belt unit 5 and the reading unit 26 about the axis of the first pivot shaft 101L and the second pivot shaft 101R of the pivot member 82 to be placed in the open position. This operation exposes the opening 2A formed in the main casing 2 to an outside. In addition, the belt unit 5 is moved upward through the opening 2A to be separated from the four photosensitive drums 12, and is placed in its external position.

When the belt unit 5 is moved upward, the first contact part 98L of the belt unit 5 separates from the left arms 39L of the cartridges 3 and the second contact part 98R of the belt unit 5 separates from the right arms 39R of the cartridges 3, thereby allowing the urging force of the coil springs 41 to move the handles 33 into their upright positions.

Consequently, the connecting part 40 of the handle 33 in one cartridge 3 (first cartridge) is retracted from the groove 34 in another cartridge 3 (second cartridge) immediately forward of the first cartridge. At this time, the connecting part 40 of the handle 33 of the first cartridge is positioned rearward of the mounting-removing path of the second cartridge with respect to a direction from upper front to lower rear. At this time, the connecting part 40 is in its second position.

In association with the movement of the cover 8 to the open position, the couplings 110 (see FIG. 3) are retracted rightward from the couplings 70 of the corresponding developing units 11.

As a result, each developing unit 11 moves to its separated position shown in FIG. 4B through the urging force of the tension springs 30.

Consequently, the arc wall 44E of the third circumferential wall 44C of the toner chamber 18 advances into the path of the laser beam L emitted from the exposure unit 4, as shown in FIG. 10, thereby blocking the path of the laser beam L to the photosensitive drum 12.

Further, the arc wall 44E of the third circumferential wall 44C of the toner chamber 18 in one cartridge 3 is moved rearward and is separated from the second opposing wall 37D of the drum cleaning unit 32 in another cartridge 3 immediately forward of the one cartridge 3. Accordingly, when viewed in the mounting-removing direction of the cartridge 3, i.e., in a direction from upper front to lower rear, the toner chamber 18 of the one cartridge 3 (first cartridge) no longer overlaps the drum unit 10 of the another cartridge 3 (second cartridge) immediately forward of the first cartridge.

Next, the user grips the handle 33 and pulls the cartridge 3 diagonally upward and forward from the main casing 2.

Through this operation, the cartridge 3 separates from the main casing 2, as depicted in dashed lines in FIG. 10.

(3) Mounting Cartridge

To mount any of the cartridges 3 in the main casing 2, the user first places the cover 8 in the open position and then inserts the cartridge 3 into the main casing 2.

Through this operation, the cartridge 3 is mounted in the main casing 2, as depicted in solid lines in FIG. 10.

Next, the user moves the cover 8 from its open position to its closed position. Consequently, the belt unit 5 is pivotally moved together with the cover 8 counterclockwise in a right side view from the external position to the internal position. At this time, the first contact part 98L and the second contact part 98R of the belt unit 5 respectively contact the left arms 39L and the right arms 39R of the handles 33 in their upright positions from an upper-rear side thereof.

As the belt unit 5 moves further toward its internal position, the handles 33 pivotally move together with the belt unit 5 counterclockwise in a right side view.

When the belt unit 5 reaches its internal position, the handles 33 are placed in their inclined position.

Note that the couplings 110 (see FIG. 3) advance leftward in association with the movement of the cover 8 toward the closed position, and are fitted into the couplings 70 of the corresponding developing units 11.

7. Operational Advantages (1) According to the image-forming apparatus 1 shown in FIG. 8, the main casing 2 includes the first side plate 81L having the protruding part 81B that is positioned leftward of and faces the fixing unit 7, and the second side plate 81R having the protruding part 81D that is positioned rightward of and faces the fixing unit 7.

The belt unit 5 is supported at the protruding part 81B of the first side plate 81L and the protruding part 81D of the second side plate 81R through the pivot member 82. The pivot member 82 is provided with the first pivot shaft 101L supported at the protruding part 81B of the first side plate 81L, the second pivot shaft 101R supported at the protruding part 81D of the second side plate 81R, the first arm 102L connected to the left end portion of the belt unit 5 through the connecting shaft 103, and the second arm 102R connected to the right end portion of the belt unit 5 through the connecting shaft 103.

Accordingly, the belt unit 5 can be moved between its internal position and its external position while being reliably supported at the first side plate 81L and the second side plate 81R.

Thus, the belt unit 5 can be moved stably between the internal position and the external position.

(2) According to the image forming apparatus 1, when the belt unit 5 is in the internal position shown in FIG. 8, the belt unit 5 is supported at the main part 81A of the first side plate 81L and the main part 81C of the second side plate 81R.

Thus, the belt unit 5 in the internal position is stably supported.

(3) According to the image forming apparatus 1, as shown in FIG. 8, the belt unit 5 includes the connecting shaft 103 that penetrates the frame 91 so as to pass through the loop formed by the belt 22. The first arm 102L is connected to the left end portion of the connecting shaft 103, and the second arm 102R is connected to the right end portion of the connecting shaft 103.

Accordingly, the belt unit 5 can be reliably supported by the connecting shaft 103 penetrating the frame 91 when the belt unit 5 is pivotally moved.

Thus, the belt unit 5 can be more stably pivotally moved.

(4) According to the image forming apparatus 1, the first side plate 81L and the second side plate 81R support the fixing unit 7.

Accordingly, the fixing unit 7 can be stably supported using the first side plate 81L and the second side plate 81R.

Further, the belt unit 5 can be pivotally moved without any possibility of interference from the fixing unit 7.

(5) According to the image forming apparatus 1, the first side plate 81L and the second side plate 81R also support the exposure unit 4.

Accordingly, the exposure unit 4 can be stably supported using the first side plate 81L and the second side plate 81R.

(6) According to the image forming apparatus 1, as shown in FIG. 6, the reading unit 26 is provided with the first connecting part 146L that is connected to the first pivot shaft 101L and can pivotally move together with the first pivot shaft 101L, and the second connecting part 146R that is connected to the second pivot shaft 101R and can pivotally move together with the second pivot shaft 101R.

Thus, the first connecting part 146L and the second connecting part 146R can be used to pivotally move the reading unit 26 together with the belt unit 5 in a configuration in which the reading unit 26 is positioned above the belt unit 5.

(7) According to the image forming apparatus 1, as shown in FIG. 1, the first pivot shaft 101L and the second pivot shaft 101R are positioned upward of the belt unit 5 and downward of the reading unit 26.

Accordingly, the belt unit 5 can be pivotally moved using the weight of the reading unit 26 when the opening 2A of the main casing 2 is exposed to an outside, as shown in FIG. 10.

Thus, the belt unit 5 can be more smoothly pivotally moved.

(8) According to the image forming apparatus 1, as shown in FIG. 1, the belt unit 5 includes the belt cleaning unit 93 for cleaning the belt 22.

Hence, the belt 22 can be cleaned using the belt cleaning unit 93.

(9) According to the image forming apparatus 1, as shown in FIG. 8, the discharge opening 96A of the belt cleaning unit 93 is positioned outward of the first side plate 81L in the left-right direction.

Thus, a space outward of the first side plate 81L can be used for processing waste toner removed by the belt cleaning unit 93.

(10) According to the image forming apparatus 1, as shown in FIG. 1, the image-forming apparatus 1 is provided with four cartridges 3 juxtaposed in the front-rear direction.

The four cartridges 3 can be used to form Pall-color images. Further, the cartridges 3 can be independently mounted in and removed from the main casing 2 of the image-forming apparatus 1.

(11) According to the image forming apparatus 1, as shown in FIGS. 1 and 10, the connecting part 40 of the handle 33 in one cartridge 3 (first cartridge) can move between the first position (see FIG. 1) in which the connecting part 40 is positioned within the mounting-removing path of another cartridge 3 (second cartridge) immediately forward of the first cartridge, and the second position (see FIG. 10) in which the connecting part 40 is retracted from the mounting-removing path of the second cartridge.

Hence, the handles 33 can be arranged so that the handle 33 of one cartridge 3 uses a space in the mounting-removing path of the another cartridge 3 immediately forward of the one cartridge 3 when the cartridges 3 are mounted in the main casing 2 and the belt unit 5 is in the internal position.

Further, when any of the cartridges 3 is removed from the main casing 2 while the belt unit 5 is in the external position, the handles 33 of the cartridges 3 are retracted from the mounting-removing paths of the cartridges 3 immediately forward.

Thus, the handles 33 can be efficiently arranged while not interfering with the mounting and removal of the cartridges 3.

Further, this configuration allows the handles 33 to be formed longer to facilitate the removal of the cartridges 3 positioned beneath the belt unit 5.

(12) According to the image forming apparatus 1, as shown in FIG. 1, each cartridge 3 has a groove 34 that can receive the connecting part 40 of a cartridge 3 immediately rearward.

Accordingly, the connecting part 40 of one cartridge 3 can be fixed in a prescribed position within the main casing 2 by fitting the connecting part 40 of the one cartridge 3 in the groove 34 formed in another cartridge 3 immediately forward of the one cartridge 3.

Hence, the connecting part 40 can be reliably prevented from interfering with peripheral members, such as the photosensitive drum 12 or the belt 22.

(13) According to the image forming apparatus 1, as shown in FIG. 1, the connecting part 40 is positioned lower than the belt 22 when the belt unit 5 is in its internal position.

This arrangement can reliably prevent the connecting part 40 from interfering with the belt 22.

(14) According to the image forming apparatus 1, as shown in FIG. 1, the connecting part 40 of one cartridge 3 is positioned forward of the photosensitive drum 12 in another cartridge 3 immediately forward of the one cartridge 3 when the connecting part 40 is in its first position.

In this way, the handle 33 can be provided with sufficient length while reliably preventing the connecting part 40 from interfering with the photosensitive drum 12.

As a result, the handle 33 can be easily gripped to remove the cartridge 3.

(15) According to the image forming apparatus 1, as shown in FIG. 1, the left arm 39L and the right arm 39R of the handle 33 overlap the belt 22 when viewed in the left-right direction while the belt unit 5 is in its internal position.

Accordingly, the left arm 39L and the right arm 39R can be arranged in a space outward of the belt 22 in the left-right direction when the belt unit 5 is in the internal position.

(16) According to the image forming apparatus 1, as shown in FIG. 1, the left arm 39L contacts the first contact part 98L when the belt unit 5 is in the internal position, and the right arm 39R contacts the second contact part 98R when the belt unit 5 is in the internal position.

Hence, the first contact part 98L and the second contact part 98R can reliably push the handle 33 into its inclined position so that the connecting part 40 is fitted into the groove 34.

(17) According to the image forming apparatus 1, as shown in FIGS. 1 and 10, the handle 33 pivotally moves counterclockwise in a right side view, i.e., the same direction as the first arm 102L and the second arm 102R pivotally move, when the belt unit 5 is moved from the external position to the internal position.

Accordingly, the first contact part 98L and the second contact part 98R can press down on the handle 33 when the belt unit 5 is moved toward its internal position in order to smoothly push the handle 33 into its inclined position.

(18) According to the image forming apparatus 1, when the cartridges 3 are mounted in the main casing 2 and the developing units 11 of the cartridges 3 are in their contact position shown in FIG. 1, the toner chamber 18 of one cartridge 3 overlaps the drum unit 10 of another cartridge 3 immediately forward of the one cartridge 3 when viewed in the mounting-removing direction of the cartridges 3.

Accordingly, when a drive force is inputted into the cartridges 3, placing the developing units 11 in the contact position, the cartridges 3 cannot be removed from the main casing 2.

Further, as shown in FIG. 10, the toner chamber 18 of one cartridge 3 does not overlap the drum unit 10 of another cartridge 3 immediately forward of the one cartridge 3 when the developing units 11 of the cartridges 3 are in their separated position.

Accordingly, the cartridges 3 can be removed from the main casing 2 by retracting the couplings 110 from the couplings 70 of the cartridges 3 to interrupt the drive force inputted into the cartridges 3 and to place the developing units 11 in their separated positions.

In other words, the cartridges 3 cannot be pulled out of the main casing 2 while the couplings 110 are coupled with the couplings 70 of the cartridges 3.

Further, a capacity of each toner chamber 18 can be increased without increasing a distance between neighboring cartridges 3, thereby avoiding an increase in size of the image-forming apparatus 1 in the front-rear direction.

(19) According to the image forming apparatus 1, when the developing unit 11 is in the contact position shown in FIG. 1, the toner chamber 18 is retracted from the path of the laser beam L.

Accordingly, the laser beam L can be reliably irradiated onto the photosensitive drum 12 when a drive force is inputted into the cartridge 3.

When the developing unit 11 is in the separated position shown in FIG. 10, the toner chamber 18 advances into the path of the laser beam L.

Hence, when a drive force is not being inputted into the cartridge 3, the toner chamber 18 can be accommodated between the left side plate 31L and the right side plate 31R by utilizing the space through which the laser beam L passes. This arrangement enables the cartridges 3 to be made more compact.

(20) According to the image forming apparatus 1, when the developing unit 11 is in the contact position shown in FIG. 1, the toner chamber 18 of one cartridge 3 overlaps the drum unit 10 of another cartridge 3 immediately forward of the one cartridge 3 with a part of the arc wall 44E of the toner chamber 18 opposite the flat wall 44D that confronts the path of the laser beam L.

Accordingly, a simple structure can be used to simultaneously restrict removal of the cartridge 3 while forming a path for the laser beam L.

While the description has been made in detail with reference to the embodiments thereof, it would be apparent to those skilled in the art that many modifications and variations may be made therein without departing from the spirit of the disclosure.

What is claimed is:

1. An image forming apparatus comprising:
a main casing having an opening;
a cartridge configured to be mounted in and removed from the main casing through the opening, the cartridge including a photosensitive drum, the photosensitive drum having an axis extending in an axial direction;
a belt unit movable between an internal position and an external position in a state where the cartridge has been mounted in the main casing, the belt unit moving outward of the main casing through the opening when moved from the internal position to the external position; and
a fixing unit including a heating member and a pressure member in contact with the heating member,
the main casing comprising:
a first side plate having a first portion facing the fixing unit in the axial direction; and
a second side plate having a second portion facing the fixing unit in the axial direction, the second side plate being positioned opposite the first side plate with respect to the fixing unit in the axial direction,
the belt unit comprising:
an endless belt, the belt being in contact with the photosensitive drum when the belt unit is in the internal position, the belt being separated from the photosensitive drum when the belt unit is in the external position;
a first pivot shaft supported at the first portion;
a first arm positioned opposite the fixing unit with respect to the first side plate in the axial direction, the first arm extending in a radial direction of the first pivot shaft, the first arm connecting the first pivot shaft to the belt unit;
a second pivot shaft supported at the second portion; and
a second arm positioned opposite the fixing unit with respect to the second side plate in the axial direction, the second arm extending in a radial direction of the second pivot shaft, the second arm connecting the second pivot shaft to the belt unit.

2. The image forming apparatus according to claim 1, wherein the first side plate has a third portion facing the cartridge in the axial direction, and the second side plate has a fourth portion facing the cartridge in the axial direction, and
wherein the belt unit is supported at the third portion and the fourth portion when the belt unit is in the internal position.

3. The image forming apparatus according to claim 1, wherein the belt unit includes:
a frame supporting the belt; and
a connecting shaft penetrating the frame so as to extend through an internal space of a loop formed by the belt, and
wherein the first arm and the second arm are connected to the connecting shaft.

4. The image forming apparatus according to claim 1, wherein the first side plate and the second side plate support the fixing unit.

5. The image forming apparatus according to claim 1, further comprising an exposure unit configured to expose the photosensitive drum to light, the exposure unit being positioned lower than the cartridge,
wherein the first side plate and the second side plate support the exposure unit.

6. The image forming apparatus according to claim 1, further comprising a reading unit positioned above the main casing, the reading unit including:
a first connecting part connected to the first pivot shaft and pivotally movable together with the first pivot shaft; and
a second connecting part connected to the second pivot shaft and pivotally movable together with the second pivot shaft.

7. The image forming apparatus according to claim 6, wherein the first pivot shaft and the second pivot shaft are positioned upward of the belt unit and downward of the reading unit.

8. The image forming apparatus according to claim 1, wherein the belt unit includes a belt cleaning unit configured to remove waste toner from the belt.

9. The image forming apparatus according to claim 8, wherein the belt cleaning unit includes:
a cleaning member in contact with the belt; and
a conveying tube having a discharge opening for discharging waste toner removed by the cleaning member to an outside of the belt cleaning unit, the discharge opening being positioned opposite the fixing unit with respect to the first side plate in the axial direction.

10. The image forming apparatus according to claim 1, wherein the cartridge comprises a plurality of cartridges arrayed in a first direction perpendicular to the axial direction.

11. The image forming apparatus according to claim 10, wherein the plurality of cartridges includes a first cartridge and a second cartridge next to the first cartridge,
wherein the first cartridge includes:
a third arm positioned between the belt and the first side plate in the axial direction, the third arm being pivotally movably supported at the first cartridge;
a fourth arm positioned between the belt and the second side plate, the fourth arm being pivotally movably supported at the first cartridge; and
a connecting part extending in the axial direction and connecting the third arm and the fourth arm, and
wherein the connecting part of the first cartridge is movable between a first position within a path along which the second cartridge is mounted in and removed from the main casing, and a second position retracted from the path along which the second cartridge is mounted in and removed from the main casing.

12. The image forming apparatus according to claim 11, wherein the second cartridge has a groove configured to receive the connecting part of the first cartridge in the first position.

13. The image forming apparatus according to claim 11, wherein the connecting part is positioned lower than the belt when the belt unit is in the internal position.

14. The image forming apparatus according to claim 11, wherein the photosensitive drum comprises a plurality of photosensitive drums, the plurality of photosensitive drums including a first photosensitive drum provided at the first cartridge and a second photosensitive drum provided at the second cartridge, and
wherein, when the connecting part of the first cartridge is in the first position, the connecting part of the first cartridge is positioned farther away from the first photosensitive drum than from the second photosensitive drum.

15. The image forming apparatus according to claim 11, wherein the third arm and the fourth arm overlap the belt as viewed in the axial direction when the belt unit is in the internal position.

16. The image forming apparatus according to claim 11, wherein the belt unit further includes a frame, the frame including:
a first contact part positioned outward of the belt in the axial direction; and
a second contact part positioned outward of the belt in the axial direction and opposite the first contact part with respect to the belt in the axial direction, and
wherein the third arm contacts the first contact part when the belt unit is in the internal position, and the fourth arm contacts the second contact part when the belt unit is in the internal position.

17. The image forming apparatus according to claim 11, wherein, when the belt unit is moved from the external position to the internal position, the third arm and the fourth arm pivotally move in a direction the same as a direction in which the first arm and the second arm pivotally move.

18. The image forming apparatus according to claim 10, wherein the plurality of cartridges includes a first cartridge and a second cartridge next to the first cartridge,
wherein the photosensitive drum comprises a plurality of photosensitive drums, the plurality of photosensitive drums including a first photosensitive drum provided at the first cartridge and a second photosensitive drum provided at the second cartridge,
wherein the first cartridge includes:
a first drum unit supporting the first photosensitive drum; and
a first developing unit including:
a first developing roller;
a pivot shaft pivotally movably supported at the first drum unit;
a first frame supporting the first developing roller; and
a second frame positioned opposite the first frame of the first developing unit with respect to the pivot shaft of the first developing unit, the first developing unit being pivotally movable between a contact position where the first developing roller is in contact with the first photosensitive drum and a separated position in which the first developing roller is separated from the first photosensitive drum,
wherein the second cartridge includes:
a second drum unit supporting the second photosensitive drum; and
a second developing unit including:
a second developing roller;
a pivot shaft pivotally movably supported at the second drum unit;
a first frame supporting the second developing roller; and
a second frame positioned opposite the first flame of the second developing unit with respect to the pivot shaft of the second developing unit, the second developing unit being pivotally movable between a contact position where the second developing roller is in contact with the second photosensitive drum and a separated position in which the second developing roller is separated from the second photosensitive drum,
wherein, when the first cartridge and the second cartridge have been mounted in the main casing and the first developing unit is in the contact position, the second frame of the first developing unit overlaps the second drum unit as viewed in a direction along which the first cartridge is mounted in and removed from the main casing, and
wherein, when the first cartridge and the second cartridge have been mounted in the main casing and the first developing unit is in the separated position, the second frame of the first developing unit is retracted from a position overlapping with the second drum unit as viewed in the direction along which the first cartridge is mounted in and removed from the main casing.

19. The image forming apparatus according to claim 18, further comprising an exposure unit configured to irradiate laser beams to expose the first photosensitive drum and the second photosensitive drum to the laser beams,
wherein the second frame of the first developing unit is retracted from a path of the laser beam when the first developing unit is in the contact position, and advances into the path of the laser beam when the first developing unit is in the separated position, and
wherein the second frame of the second developing unit is retracted from a path of the laser beam when the second developing unit is in the contact position, and advances into the path of the laser beam when the second developing unit is in the separated position.

20. The image forming apparatus according to claim 19, wherein the second frame of the first developing unit includes a first wall facing the path of the laser beam, and a second wall positioned opposite to the path of the laser beam with respect to the first wall, and wherein, when the first cartridge and the second cartridge have been mounted in the main casing and the first developing unit is in the contact position, the second wall overlaps the second drum unit as viewed in the direction along which the first cartridge is mounted in and removed from the main casing.

\* \* \* \* \*